(12) United States Patent
Miura et al.

(10) Patent No.: US 10,194,473 B2
(45) Date of Patent: Jan. 29, 2019

(54) ACCESS POINT DEVICE FOR WORK MACHINE, COMMUNICATION SYSTEM FOR WORK MACHINE, WORK MACHINE, AND DATA TRANSMITTING METHOD FOR WORK MACHINE

(71) Applicant: KUBOTA CORPORATION, Osaka-shi (JP)

(72) Inventors: Keisuke Miura, Sakai (JP); Isao Tanaka, Sakai (JP); Izuru Shimamoto, Sakai (JP); Kazuo Sakaguchi, Sakai (JP); Yoshito Hayakawa, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/193,108

(22) Filed: Jun. 27, 2016

(65) Prior Publication Data
US 2016/0309530 A1    Oct. 20, 2016

Related U.S. Application Data

(63) Continuation of application No. PCT/JP2015/059067, filed on Mar. 25, 2015.

(30) Foreign Application Priority Data

Mar. 28, 2014   (JP) ................................. 2014-068711
Mar. 28, 2014   (JP) ................................. 2014-068712
Mar. 28, 2014   (JP) ................................. 2014-068713

(51) Int. Cl.
*H04W 76/11*     (2018.01)
*H04W 48/10*     (2009.01)
(Continued)

(52) U.S. Cl.
CPC ............. *H04W 76/11* (2018.02); *G07C 5/008* (2013.01); *H04W 48/10* (2013.01); *A01B 79/005* (2013.01);
(Continued)

(58) Field of Classification Search
CPC ..... G06F 3/0482; H04W 84/12; H04W 88/02; H04W 4/008; H04M 1/7253
See application file for complete search history.

(56) References Cited

U.S. PATENT DOCUMENTS 8,670,747 B1 *   3/2014   Muller ................ H04W 84/005
                                                       380/270
2012/0140752 A1 *  6/2012   Yun ..................... B60L 11/1846
                                                       370/338
2016/0226676 A1 *  8/2016   Shin ....................... H04B 11/00

FOREIGN PATENT DOCUMENTS

JP          06-311566           11/1994
JP          2002-263341          9/2002
(Continued)

OTHER PUBLICATIONS

Japanese Office Action for corresponding JP Application No. 2014-068711, dated Aug. 29, 2017.
(Continued)

*Primary Examiner* — Jung H Park
(74) *Attorney, Agent, or Firm* — Mori & Ward, LLP

(57) ABSTRACT

An access point device for a work machine is configured to connect a work machine and a mobile terminal via wireless communication. The access point includes a memory, a controller, and a communicator. The memory is to store data of the work machine. The controller is to set a request as a communication identifier to be received by a mobile terminal. The mobile terminal is configured to obtain the data stored in the memory in accordance with the request. The communicator is to transmit the communication identifier to
(Continued)

the mobile terminal and to transmit the data stored in the memory to the mobile terminal.

18 Claims, 19 Drawing Sheets

(51) Int. Cl.
*G07C 5/00* (2006.01)
*A01B 79/00* (2006.01)
*H04W 84/18* (2009.01)
*H04W 84/00* (2009.01)

(52) U.S. Cl.
CPC .......... *H04W 84/005* (2013.01); *H04W 84/18* (2013.01); *Y02P 60/214* (2015.11)

(56) References Cited

FOREIGN PATENT DOCUMENTS

| | | |
|---|---|---|
| JP | 2009-055219 | 3/2009 |
| JP | 2009-220800 | 10/2009 |
| JP | 2010-215050 | 9/2010 |
| JP | 2013-021435 | 1/2013 |
| JP | 2014-042508 | 3/2014 |

OTHER PUBLICATIONS

Japanese Office Action for corresponding JP Application No. 2014-068712, dated Aug. 29, 2017.
Japanese Office Action for corresponding JP Application No. 2014-068713, dated Aug. 29, 2017.
International Search Report for corresponding International Application No. PCT/JP2015/059067, dated Jun. 9, 2015.

* cited by examiner

FIG. 5

| Accumulated operation time (Hour meter) | Operation information ||||
|---|---|---|---|---|
| | Engine revolution speed (rpm) | Water temperature (°C) | Oil temperature (°C) | Battery voltage (V) |
| 116.1 | 815 | 39.2 | 63.8 | — |
| 116.2 | 867 | — | 62.8 | — |
| 116.3 | 855 | — | — | — |
| 116.4 | 858 | — | — | — |
| 116.5 | 860 | 40.1 | — | — |
| 116.6 | 861 | 41.1 | 67.5 | — |
| 116.7 | 915 | 43 | 67.3 | — |
| 116.8 | 998 | — | 67.2 | — |
| 116.9 | 1010 | — | — | — |
| 117 | 1025 | 43.8 | — | 12.3 |
| 117.1 | 1022 | 44.5 | — | — |
| 117.2 | 1028 | 46.3 | 68.3 | — |
| 117.3 | 1038 | | 68.8 | — |
| ⋯ | ⋯ | ⋯ | ⋯ | ⋯ |

Q1 (column: Battery voltage)

FIG. 6

Transmission table

| Items | Transmission completion time |
|---|---|
| Engine revolution speed | 116.7 |
| Water temperature | 116.7 |
| Oil temperature | 116.7 |
| Battery voltage | 115.9 |
| ⋮ | ⋮ |

FIG. 14

| Error code | |
|---|---:|
| Oil temperature sensor abnormality | 2376 |
| Water temperature sensor abnormality | 2377 |
| Battery voltage abnormality | 2378 |
| Overheat | 2379 |
| . | . |
| . | . |
| . | . |

ACCESS POINT DEVICE FOR WORK MACHINE, COMMUNICATION SYSTEM FOR WORK MACHINE, WORK MACHINE, AND DATA TRANSMITTING METHOD FOR WORK MACHINE

CROSS-REFERENCE TO RELATED APPLICATIONS

The present application is a continuation application of International Application No. PCT/JP2015/059067, filed Mar. 25, 2015, which claims propriety to Japanese Patent Application No. 2014-068711, filed Mar. 28, 2014, to Japanese Patent Application No. 2014-068712, filed Mar. 28, 2014, and to Japanese Patent Application No. 2014-068713, filed Mar. 28, 2014. The contents of these applications are incorporated herein by reference in their entirety.

BACKGROUND OF THE INVENTION

Field of the Invention

The present invention relates to an access point device for a work machine, a communication system for a work machine, a work machine, and a data transmitting method for a work machine.

Discussion of the Background

JP 2014-042508 A discloses an access point device for a work machine to communicate between a work machine and a mobile terminal, the access point including: a communication processing part configured to output a beacon to perform a communication process with the mobile terminal; and a process pausing part configured to perfonn a pausing process to pause the communication process.

SUMMARY OF THE INVENTION

According to one aspect of the present invention, an access point device for a work machine is configured to connect a work machine and a mobile terminal via wireless communication. The access point device includes a memory, a controller, and a communicator. The memory is to store data of the work machine. The controller is to set a request as a communication identifier to be received by the mobile terminal. The mobile terminal is configured to obtain the data stored in the memory in accordance with the request. The communicator is to transmit the communication identifier to the mobile terminal and to transmit the data stored in the memory to the mobile terminal.

According to another aspect of the present invention, a communication system for a work machine includes a mobile terminal and an access point device. The access point device is to connect the mobile terminal and the work machine via wireless communication. The access point device includes a memory, a controller, and a communicator. The memory is to store data of the work machine. The controller is to set a request as a communication identifier to be received by the mobile terminal. The mobile terminal is configured to obtain the data stored in the memory in accordance with the request. The communicator is to transmit the communication identifier to the mobile terminal and to transmit the data stored in the memory to the mobile terminal.

According to still another aspect of the present invention, an access point device for a work machine is configured to connect a work machine and a mobile terminal via wireless communication. The access point device includes a state receiver, a controller, and a communicator. The state receiver is to obtain a state of the work machine The controller is to generate a first identifier showing the state of the work machine. The communicator is to transmit the first identifier and a second identifier to be used for a connection of wireless communication.

According to further aspect of the present invention, a communication system for a work machine includes a mobile terminal and an access point device. The access point device is to connect the mobile terminal and the work machine via wireless communication. The access point device includes a state receiver, a controller, and a communicator. The state receiver is to obtain a state of the work machine. The controller is to set a first identifier showing the state of the work machine. The communicator is to transmit the first identifier and a second identifier to be used for a connection of wireless communication.

According to further aspect of the present invention, a work machine includes a receiver, a controller, and a communicator. The receiver is to obtain information data outputted to an in-vehicle network of the work machine. The controller is to set the information data as a communication identifier to be received by a mobile terminal when the receiver obtains the information data. The communicator is to transmit the communication identifier to the mobile terminal via wireless communication.

According to further aspect of the present invention, a communication system for a work machine is configured to connect an in-vehicle network of the work machine to a mobile terminal. The communication system includes a receiver, a controller, and a communicator. The receiver is to obtain information data outputted to the in-vehicle network. The controller is to set the information data as a communication identifier to be received by the mobile terminal when the receiver obtains the information data. The communicator is to transmit the communication identifier to the mobile terminal via wireless communication.

According to further aspect of the present invention, an access point device for a work machine is configured to connect a work machine and a mobile terminal via wireless communication. The access point device includes storage means, identifier setting means, and communication means. The storage means is for storing data of the work machine. The identifier setting means is for setting a request as a communication identifier to be received by a mobile terminal. The mobile terminal is configured to obtain the data stored in the storage means in accordance with the request. The communication means is for transmitting the communication identifier to the mobile terminal and transmitting the data stored in the storage means to the mobile terminal.

According to further aspect of the present invention, a data transmitting method for a work machine includes: storing data of the work machine in a memory of the work machine; setting a request as a communication identifier to be received by a mobile terminal, the mobile terminal being configured to obtain the data stored in the memory in accordance with the request; and transmitting the communication identifier to the mobile terminal and the data stored in the memory to the mobile terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a view showing an example of the updated operation data according to the first embodiment;

FIG. 6 is a view showing an example of a transmission table according to the first embodiment;

FIG. 14 is a view showing an example of an error code according to the fourth embodiment;

DESCRIPTION OF THE EMBODIMENTS

Figure 1:
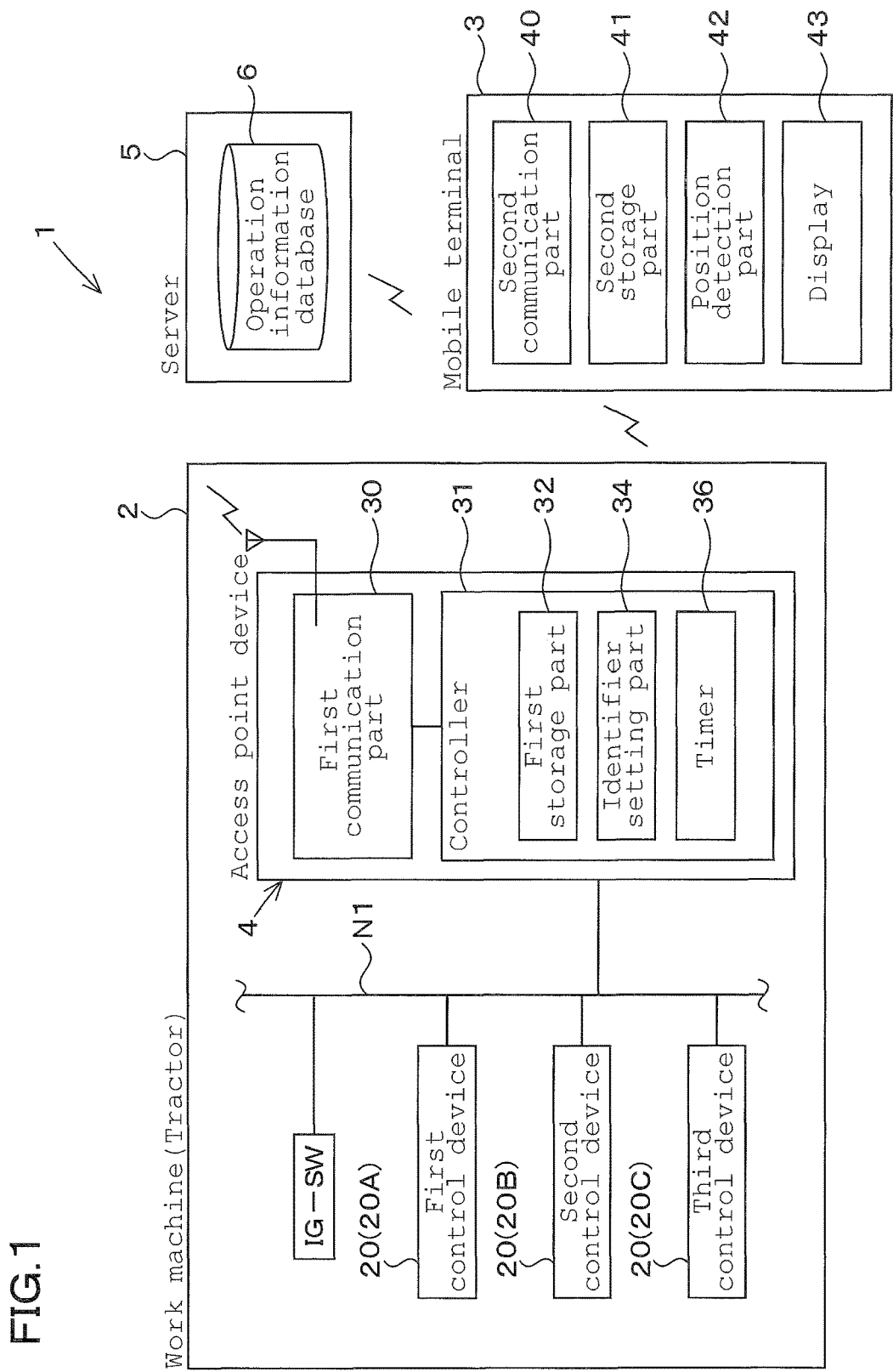
FIG. 1 is an overall view of a communication system of a work machine according to a first embodiment.

Referring to drawings, embodiments of the present invention will be explained below. The embodiments will now be described with reference to the accompanying drawings, wherein like reference numerals designate corresponding or identical elements throughout the various drawings.
(First Embodiment)

FIG. 1 shows an overall view of a communication system of a work machine.

As shown in FIG. 1, a communication system 1 of the work machine is a system including an access point device 4 for work machines and a mobile terminal 3, the access point device 4 being mounted on a work machine 2 such as an agricultural machine and a construction machine, the mobile terminal 3 being configured to communicate with the access point device 4 for work machines in wireless. In the communication system 1 for working machines, the mobile terminal 3, for example, is capable of obtaining information relating to the work machine 2 through the access point device 4 for work machine 4 by connecting the mobile terminal 3 to the access point device 4 for work machines The work machine 2, meanwhile, is capable of obtaining various signals from the mobile terminal 3 through the access point device 4 for work machines.

In the following description, the work machine is a tractor that is one of the agricultural machines, and the communication system for work machines and the access point device for work machines will be explained below in detail. For the convenience of the description, the explanation will be made referring "the access point device for work machines" to as "the access point device".

Figure 19:
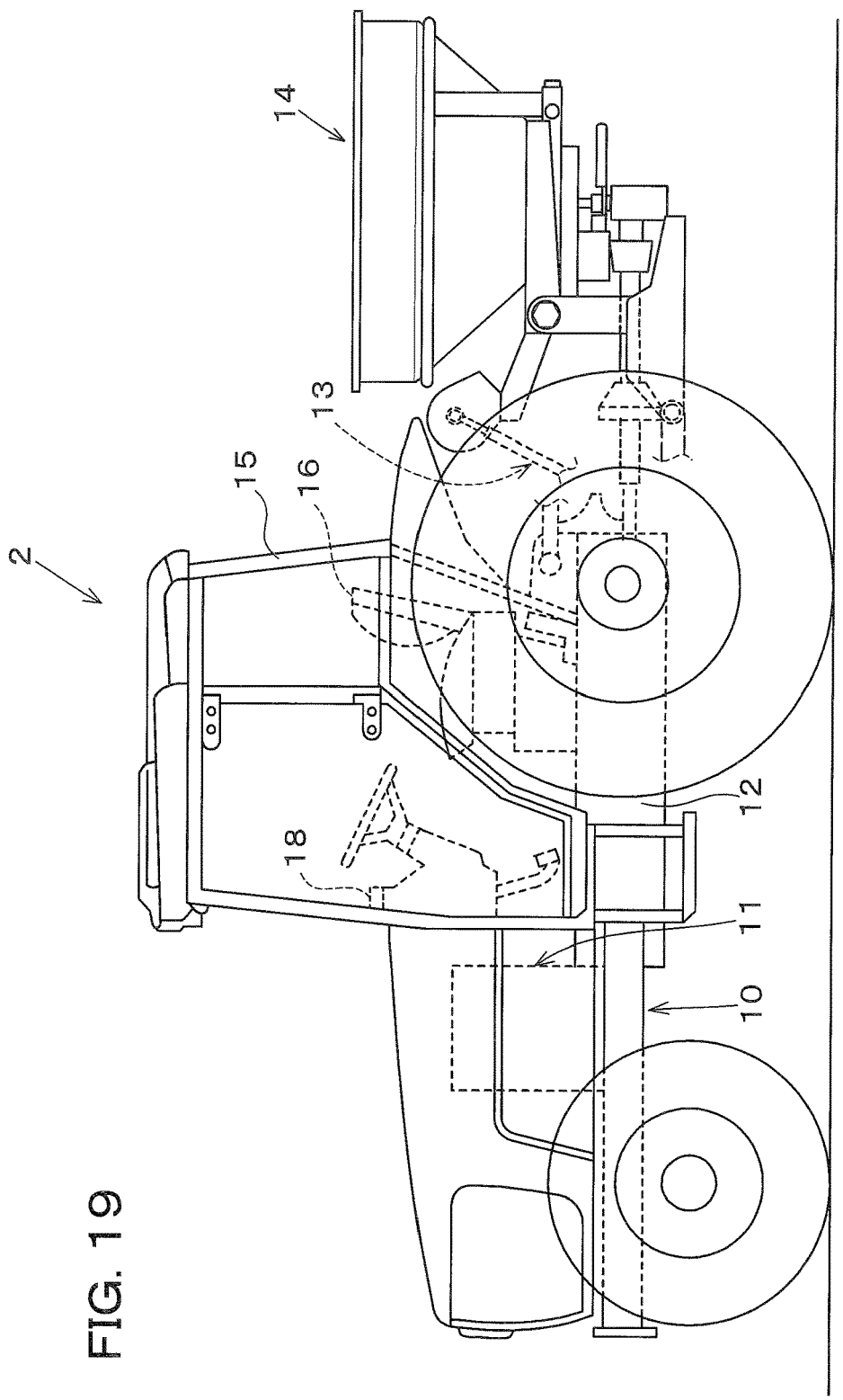
FIG. 19 is an overall side view of a tractor according to the first embodiment.

As shown in FIG. 19, the tractor 2 is configured by mounting an engine 11, a transmission device 12, and the like on a traveling car (a travel body) 10 having wheels on the front and the rear. A three-point link mechanism 13 and the like are disposed on a rear portion of the traveling car 10, the three-point link mechanism 13 being capable of moving upward and downward. An operation tool 14 such as a cultivator, a fertilizer distributor, an agricultural chemicals distributor, a seed distributor, or a harvest machine can be freely attached to and detached from the three-point link mechanism 13. A cabin 15 of an independently-mounted type is disposed behind the engine 11, and an operator seat 16 is disposed in the cabin 15. A display device 18 is disposed around the operator seat 16, the display device 18 being configured to display various information of the tractor 2.

A plurality of electronic devices, that is, electric components are mounted on the tractor 2. The electronic devices are each devices for operating the tractor 2, that is, a sensor (an acceleration pedal sensor, a lever detection sensor, a crank position sensor, a fuel sensor, a water temperature sensor, and the like), a switch (an ignition switch, a parking brake switch, a PTO switch, and the like), a display device constituted of a display panel and the like, a control device for controlling the tractor, a control device for controlling the operation tool 14, for example. The plurality of electronic devices are connected to communication lines, and thus an in-vehicle network Ni is constituted in the tractor 2. The in-vehicle network N1 employs, for example, the CAN (Controller Area Network), the LIN (Local Interconnect Network), the FlexRay, or the like.

Detection signals detected by the sensor, switch signals showing states of the switches, command signals (control signals) for working operating portions (for example, an engine, an electromagnetic valve, a pump) on the tractor 2, and the like are outputted to the in-vehicle network N1, the operating portions being to be operated in accordance with controls by the control devices. In addition, an information signal is outputted to the in-vehicle network N1, the information signal notifying a warning, a malfunction, or the like.

FIG. 1 is a view showing the plurality of control devices, the in-vehicle network, and the access point device for work machine.

As shown in FIG. 1, the tractor 2 includes, for example, a first control device 20A, a second control device 20B, and a third control device 20C each serving as a control device 20, the first control device 20A being configured to control the engine 11, the second control device 20B being configured to control the transmission device 12 and the three-point link mechanism 13, and the third control device 20C being configured to control the display device 18. The sensors, the switches, or the like are connected to the first control device 20A, the second control device 20B, the third control device 20C, and the like serving as the control device 20, and detection signals and switch signals are outputted to the in-vehicle network N1 through the control device 20, the detection signals being detected by the sensors, the switch signals showing states of the switches.

The first control device 20A, for example, controls a revolution speed and the like of the engine on the basis of signals of the acceleration pedal sensor, the lever detection sensor, the crank position sensor, the acceleration pedal sensor being configured to detect an operation amount of the acceleration pedal when the acceleration pedal is operated, the lever sensor being configured to detect a position of the shift lever when the shift lever for gear change is operated, the crank position sensor being configured to detect a position of a crank. The second control device 20B controls the upward moving and the downward moving of the three-point link mechanism 13 on the basis of a position lever sensor and the like being configured to detect an operation amount of an operation member (an operation lever) for operating the three-point mechanism 13. In addition, the third control device 20C controls the display device 18 on the basis of signals of the sensors, the switches, and the like, and controls, for example, a movement of an indication needle disposed on the display device 18, ON and OFF of LEDs, a display of a liquid crystal display part, and the like. Controls of the first control device 20A, the second control device 20B, and the third control device 20C are not limited to the controls described above.

As shown in FIG. 1, the access point device 4 is a device configured to connect the in-vehicle network N1 of the tractor 2 to a network provided outside the tractor 2 (an outside network). The access point device 4 includes a first communication part (a communication module or a communicator) 30, a controller 31, a first storage part 32, and a timer 36, the first communication part being configured to perform a wireless communication with the mobile terminal 3, the controller 31 being configured to control the first communication part 30.

The first communication part 30 performs the wireless communication in the Wi-Fi (Wireless Fidelity, registered trademark) of the IEEE802.11 series that is a communication standard. To be detailed, the first communication part 30 outputs data (the signals) to the controller 31 after converting the data received from outside into a communication form of the access point device 4, or outputs data (the signals) to the outside after converting the data transmitted from the controller 31 into a communication form of the IEEE 802.11 series. That is, the first communication part 30 outputs the data (the signals) to the controller 31, the data being received from the outside, and transmits the data (the signals) to the outside, the data being outputted from the controller 31.

The controller 31 converts data into a communication form of the access point device 4, the data being received from the in-vehicle network N1, and then transmits the data to the first communication part 30, the data being received from the in-vehicle network N1. An operation of the controller 31, meanwhile, is not limited to the operation described above.

The timer 36 is, for example, a timer configured to measure an accumulated operation time (an hour meter) of operation of the tractor 2. In the first embodiment, the timer 36 is explained as the timer configured to measure the accumulated operation time, however may be a timer configured to measure a current time and may be a timer configured to measure a predetermined time.

The first storage part 32 is constituted of a nonvolatile memory or the like. The first storage part 32 stores the communication setting information and the various operation information, the communication setting information being related to connection of the wireless communication and the like, the various operation information being obtained from the tractor 1. To be detailed, the first storage part 32 stores a unique MAC address, an identifier (for example, a service set identifier, SSID), an encryption key (a network key), and the like as the communication setting information, the MAC address being set on the network, the identifier being used for identifying the access point device 4.

Figure 2:
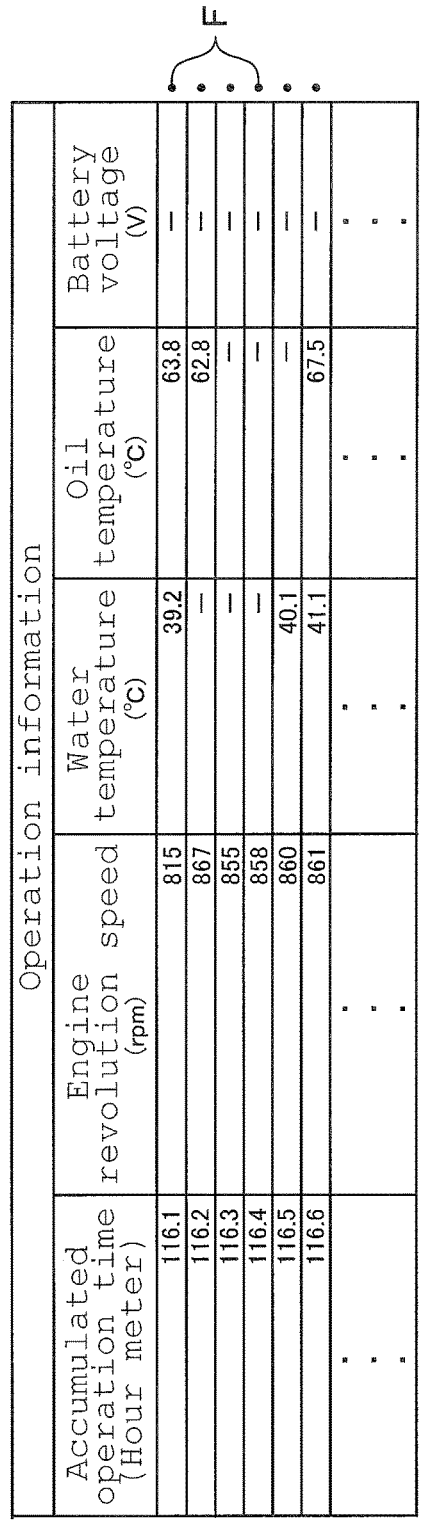
FIG. 2 is a view showing an example of operation data stored in a first storage part according to the first embodiment.

In addition, the first storage part 32 stores the operation information such as the detection signal, the switch signal, and the command signal. As shown in FIG. 2, the first storage part 32 relates the operation information to the accumulated operation time measured by the timer 36, the operation information being, for example, an engine revolution speed, a water temperature, and an oil temperature each obtained from the detection signals, and stores the operation information.

The mobile terminal 3 is, for example, constituted of a smartphone (a multifunctional mobile phone) or a tablet PC, which has a relatively high computing capability. As shown in FIG. 1, the mobile terminal 3 includes a second communication part (a communication means) 40 and a second storage part 41.

The second communication part 40 is constituted of a communication device configured at least to perform a wireless communication with the access point device 4. The second communication part 40 performs a short-range wireless communication with the access point device 4 in, for example, the Wi-Fi (Wireless Fidelity, registered trademark) of the IEEE802.11 series that is a communication standard.

The second communication part 40, meanwhile, may perform a wireless communication with a server 5 or the like through a data communication network or a mobile phone communication network in addition to the short-range wireless communication. In addition, the mobile terminal 3 may include a position detection part 42, the position detection part 42 being configured to receive signals (positions of GPS satellites, transmission times, correction information, and the like) transmitted from positioning satellites (for example, the GPS satellites) and to detect an own position (for example, a latitude and a longitude) on the basis of the received signals. In a case where the position detection part 42 is included, an agricultural operator is capable of detecting a position of the agricultural operator (an operator position) in an agricultural operation when an agricultural operator carries the mobile terminal 3 in the agricultural operation.

The second storage part 41 is constituted of a nonvolatile memory or the like, and stores data such as the operation information transmitted from the access point device 4. Or, the second storage part 41 stores data transmitted from the server 5.

Figure 3:
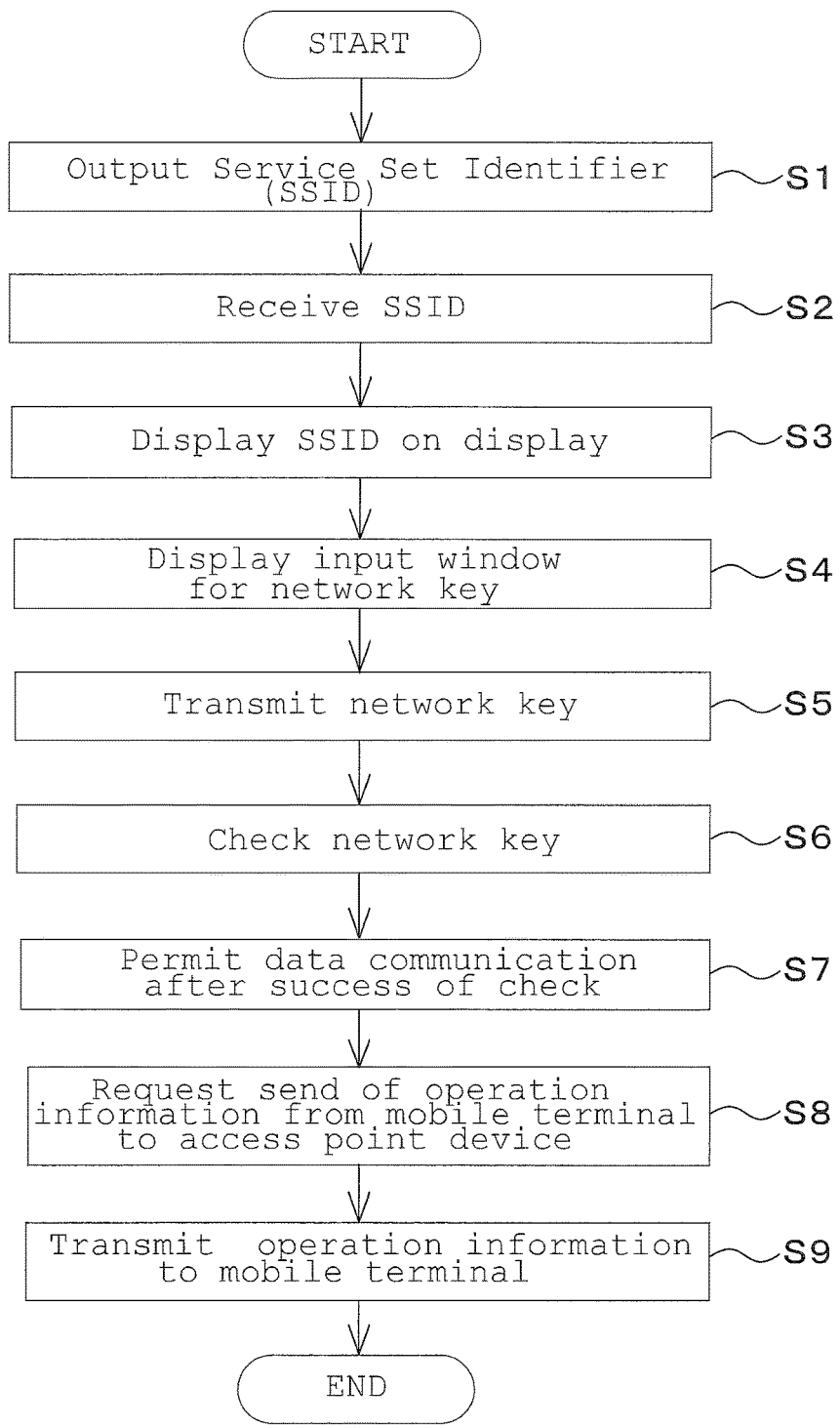
FIG. 3 is a flowchart showing a flow of obtaining the operation data according to the first embodiment.

FIG. 3 shows a flow chart of obtaining the operation information from the access point device.

To obtain the operation information, processes from S1 to S7 shown in FIG. 3 are processed, and thus a wireless communication between the access point device 4 and the mobile terminal 3 is established.

To be detailed, as shown in FIG. 3, the first communication part 30 refers to the communication setting information of the first storage part 32 under a state where the access point device 4 has been started up, and then outputs the service set identifier (SSID) to an outside (S 1). When the mobile terminal 3 receives the SSID transmitted from the first communication part 30 to the outside (S2), the mobile terminal 3 displays the SSID on the display 43 composed of a liquid crystal panel and the like (S3) and displays an input widow for the network key on the display 43 (S4). When the network key is inputted to the input window, the mobile terminal 3 transmits the network key to the access point device 4 (S5). When the network key transmitted from the mobile terminal 3 is inputted to the access point device 4, the controller 31 checks (authenticates) the network key transmitted from the mobile terminal 3 with the network key stored in the first storage part 32 (S6). Here, when the checking (authenticating) of the network is success, the controller 31 permits the data communication between them (S7). In this manner, the wireless communication between the access point device 4 and the mobile terminal 3 is established in order to obtain the operation information (the data).

In a case where the checking between the network key from the mobile terminal 3 and the network key stored in the first storage part 32 is not success, the control part 31 does not establish the wireless communication with the mobile terminal 3 and thus does not permit the data communication. Meanwhile, the process to establish the wireless communication between the first communication part 30 and the mobile terminal 3 is not limited to the process described above, and the process to display the network key on the input window may be omitted.

Then, the mobile terminal 3 is operated and then requests the access point device 4 to transmit the operation information (S8). For example, a collection button is displayed on the display 43 of the mobile terminal 3, the collection button commanding collection of the operation information, and then the mobile terminal 3 requests the access point device 4 to transmit the operation information when an operator and the like selects the collection button. Meanwhile, the transmission request for the operation information from the mobile terminal 3 to the access point device 4 is not limited to the request described above.

Then, when the access point device 4 receives the transmission request for the operation information from the mobile terminal 3, the access point device 4 transmits the operation information stored in the first storage part 32 to the mobile terminal 3 (S9).

In this manner, the wireless communication between the access point device 4 and the mobile terminal 3 is established, and thereby the operation information stored in the first storage part 32 of the access point device 4 can be transmitted to the mobile terminal 3 through the first communication part 30. The operation information obtained by the mobile terminal 3 is stored in the second storage part 41. In addition, data of the mobile terminal 3 can be transmitted to the electronic devices such as the first communication part 30, the controller 31, and the control devices 20.

The second communication part 40 of the mobile terminal 3, meanwhile, can transmit the operation information to the server 5 through the mobile phone communication network or the data communication network, the operation information being stored in the second storage part 41. In the server 5, an operation information database 6 stores the operation information transmitted from the mobile terminal 3. Then, the server 5 is capable of sorting and analyzing the operation information with use of the operation information stored in the operation information database 6.

Meanwhile, in a case where the identical mobile terminal 3 issues the transmission requests for the operation information to the access point device 4 at a short interval, the operation information identical to the previous one is transmitted to the identical mobile terminal 3. In addition, in a case where the mobile terminal 3 issues the transmission request immediately after the operation information is transmitted to another mobile terminal 3 different from the mobile terminal 3, operation information identical to the operation information stored in the another mobile terminal 3 is also transmitted to the mobile terminal 3. That is, in a case where the identical or different mobile terminal 3 issues the transmission request for the operation information before the operation information of the first storage part 32 is updated, the operation information is redundantly saved in the mobile terminals 3.

Thus, the communication system 1 for work machines has a configuration to prevent the operation information as much as possible from being duplicated, the operation information being transmitted from the access point device 4.

The transmission of the operation information will be explained further in detail below.

As shown in FIG. 1, the controller 31 of the access point device 4 includes an identifier setting part 34.

The identifier setting part 34 sets a request to obtain the operation information as a communication identifier capable of being obtained by the mobile terminal 3, the operation information being stored in the first storage part 32. That is, when the access point device 4 needs to issue the obtain request to the mobile terminal 3, the identifier setting part 34 sets the obtain request as the service set identifier (SSID). For example, the identifier setting part 34 monitors the operation information of the first storage part 32, and then when the operation information is updated, the identifier setting part 34 shows the obtain request requesting the obtain of the operation information by using alphanumeric characters, for example, "TRACTOR-DATAUP", and sets the "TRACTOR-DATAUP" as the communication identifier that is the service set identifier. To be detailed, in setting the communication identifier, the identifier setting part 34 sets the characters (TRACTOR) in a former portion (posterior to the hyphen) of the communication identifier as identification infoiniation capable of specifying the access point device 4 or the tractor 2, and adds the "DATAUP" to a latter portion continuing to the identification information (TRACTOR), the "DATAUP" showing the obtain request. In this manner, based on the characters shown in the former portion of the communication identifier, it can be known which access point device 4 or tractor 2 transmits the communication identifier. The setting of the communication identifier showing the obtain request is not limited to the setting described above.

Then, the first communication part 30 transmits the communication identifier after the setting of the communication identifier. In addition, the first communication part 30 stops transmitting the communication identifier shown by the "TRACTOR-DATAUP" when the mobile terminal 3 obtains the operation information in accordance with a request shown in the communication identifier after the transmission of the communication identifier.

Figure 4:
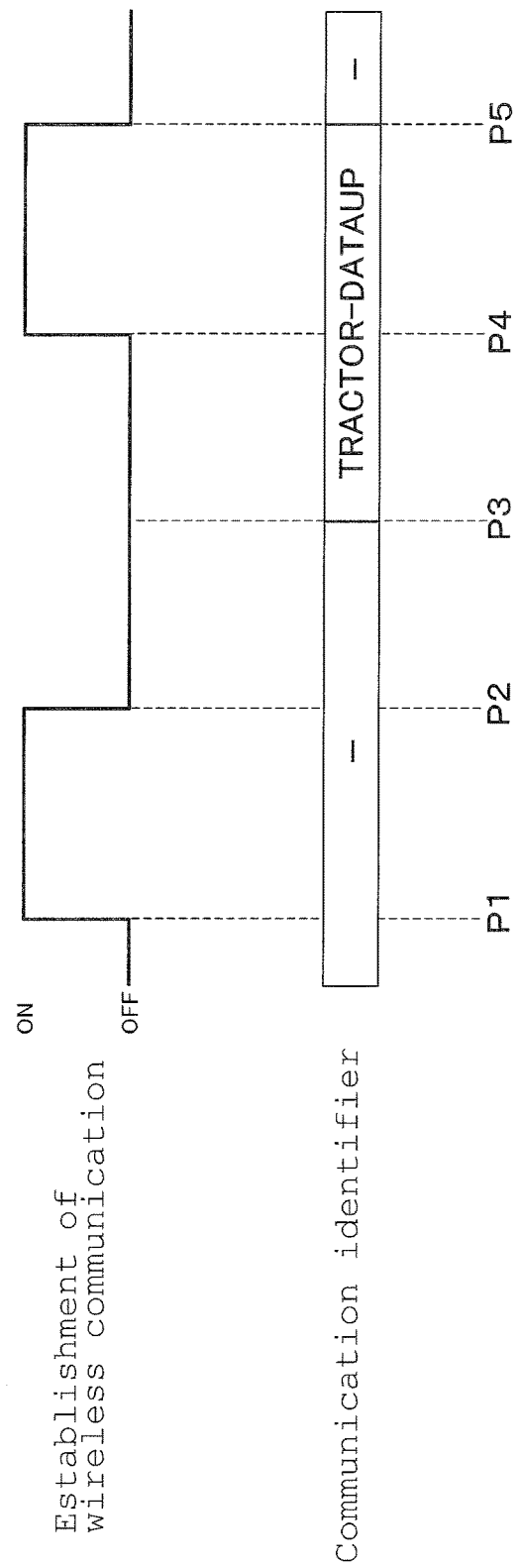
FIG. 4 is an explanation view explaining variation of a communication identifier according to the first embodiment.

Referring to FIG. 4, the obtain request described above will be explained further in detail.

As shown in FIG. 4, the wireless communication between the mobile terminal 3 and the access point device 4 is established in an interval from a time point P1 to a time point P2, and the operation information is transmitted from the access point device 4 toward the mobile tenninal 3. As shown in FIG. 2, the operation information and a flag F showing completion of the transmission are related to each other and stored in the first storage part 32 after the operation information has been transmitted. To be detailed, at the time point P2, when the mobile terminal has received the operation information, the mobile terminal 3 returns completion of the receiving of the operation information to the access point device 4. As shown in FIG. 2, the controller 31 of the access point device 4 relates the transmitted flag F to the operation information transmitted to the mobile terminal 3 in response to the return from the mobile terminal, and the related flag F is stored in the first storage part 32.

FIG. 5 shows the operation information updated after the transmission of the operation information. As shown in FIG. 5, when a predetermined time has passed after the operation information is transmitted, the operation information newly obtained is stored together with the accumulated operation time in the first storage part 32. For example, assuming that the operation information is updated at a time point P3 shown in FIG. 4, the identifier setting part 34 sets the communication identifier (TRACTOR-DATAUP) showing the obtain request. Then, the first communication part 30 outputs the communication identifier shown by the "TRACTOR-DATAUP".

Here, the mobile terminal 3 connects to the access point device 4 after the mobile terminal 3 received the communication identifier shown by the "TRACTOR-DATAUP" at a time point P4, and issues the transmission request. Then, as shown in FIG. 5, the controller 31 of the access point device 4 reads the operation information not having been transmitted and the accumulated operation time (the operation information not transmitted yet and an operation accumulation time) Q1 from the first storage part 32, and transmits the read operation information and accumulated operation time Q1 from the first communication part 30 to the mobile terminal 3.

After that, when the mobile terminal 3 completes the receiving of the operation information at a time point P5, the mobile terminal 3 transmits the completion information toward the access point device 4, the completion information showing the completion of the receiving of the operation information. When the access point device 4 receives the completion information transmitted from the mobile terminal 3, the first communication part 30 stops transmitting the "TRACTOR-DATAUP" that is the communication identifier.

As described above, the access point device 4 includes the first storage part 32, the identifier setting part 34, and the first communication part 30, and thus is capable of transmitting the obtain request for the operation information as the communication identifier when the operation information of the first storage part 32 is updated. In other words, the obtain request for the operation information can be transmitted as a broadcast signal. Accordingly, the update of the operation infoimation can be known on a side of the mobile terminal 3 only by receiving the communication identifier, and can obtain the updated operation information after the update. That is, the mobile terminal 3 can be prevented from redundantly obtaining the identical operation information before the update.

Especially, the first communication part 30 stops transmitting the communication identifier when the mobile terminal 3 obtains the operation information in accordance with the request shown in the communication identifier. In this manner, when one of the plurality of the mobile terminals 3 obtains the operation information in accordance with the obtain request in a case where the plurality of the mobile terminals 3 received the communication identifier at the same time, the rest of the mobile terminals can know the obtain, and in that point the identical operation information before the update can be prevented from being redundantly obtained.

In the first embodiment described above, the operation information before update and the operation information after update are distinguished by storing the flag F in the first storage part 32, the flag F corresponding to the operation information already transmitted, however instead of that, the accumulated operation time corresponding to the operation information already transmitted may be stored as a transmission completion time in the first storage part 32, and thus the operation information before update may be distinguished from the operation information after update on the basis of the transmission completion time.

Next, a modified example where the transmission completion time is stored in the first storage part 32 will be explained. As shown in FIG. 6, the first storage part 32 stores a transmission table showing the accumulated operation times (the transmission completion time) already transmitted for each of items of the operation information. To be detailed, in a case where the mobile terminal 3 receives an engine revolution speeds in the accumulated operation time from "116.1 h" to "116.7 h", the mobile terminal 3 returns, as the transmission completion time, the latest accumulated operation time "116.7 h" of the plurality of the received engine revolution speeds to the access point device 4. As shown in FIG. 6, in response to the return from the mobile terminal 3, the controller 31 of the access point device 4 stores the "116.7 h" that is the transmission completion time for the item corresponding to the engine revolution speed, the item being shown in the transmission table.

After the setting of the latest accumulated operation time (the transmission completion time) in the transmission table, the identifier setting part 34 monitors the accumulated operation time of the engine revolution speeds that is an update storage time, the accumulated operation time being stored in the first storage part 32. Then, when the update storage time of the engine revolution speed exceeds the transmission completion time (116.7 h) of the engine revolution speed, the transmission completion time being shown in the transmission table, the identifier setting part 34 sets the communication identifier showing the obtain request, and the first communication part 30 outputs the communication identifier.

Figure 7:
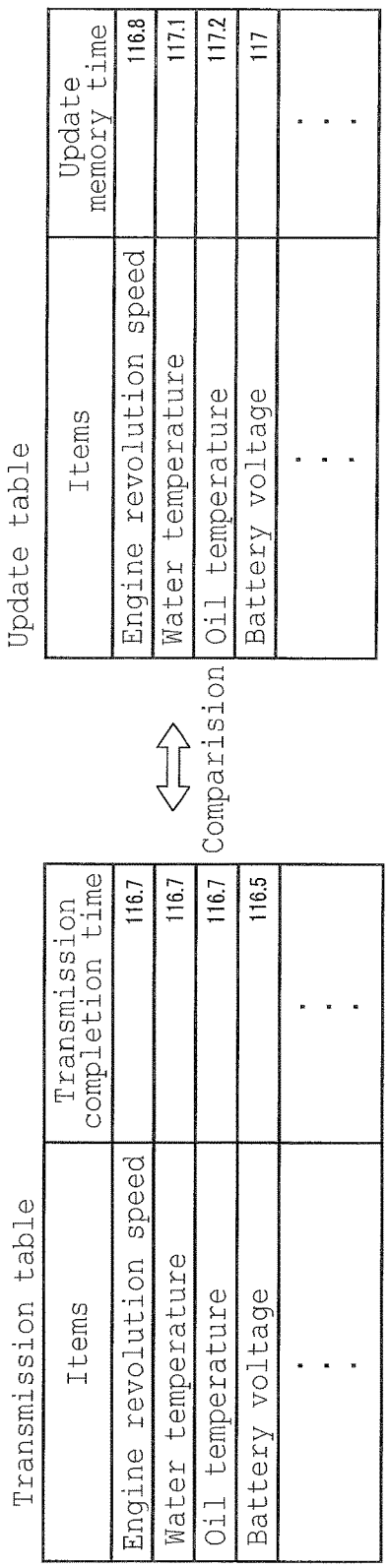
FIG. 7 is an explanation view explaining comparison between a transmission completion time and an update memory time according to the first embodiment.

In the modified example described above, of the transmission completion times of the items (the engine revolution speed, the water temperature, the oil temperature), the predetermined transmission completion time (the transmission completion time of the engine revolution speed) and the predetermined update storage time (the transmission completion time of the engine revolution speed) are compared to each other, and then the obtain request is issued at a time when the predetermined update storage time exceeds the predetermined transmission completion time. Instead of that, as shown in FIG. 7, the transmission completion time and the update completion time may be compared with each other for each of the items, and then the obtain request may be issued when the transmission completion time exceeds the update storage time for all the items. In this manner, the obtain request can be issued to the mobile terminal 3 at a time when all the items stored in the first storage part 32 are updated, and thus the duplicated obtains of the operation information can be prevented.

(Second Embodiment)

A second embodiment describes an embodiment of a case where the access point device 4 is mounted on an agricultural machine to collect data of the agricultural machine.

Configurations different from the configurations of the first embodiment will be explained.

Figure 8:
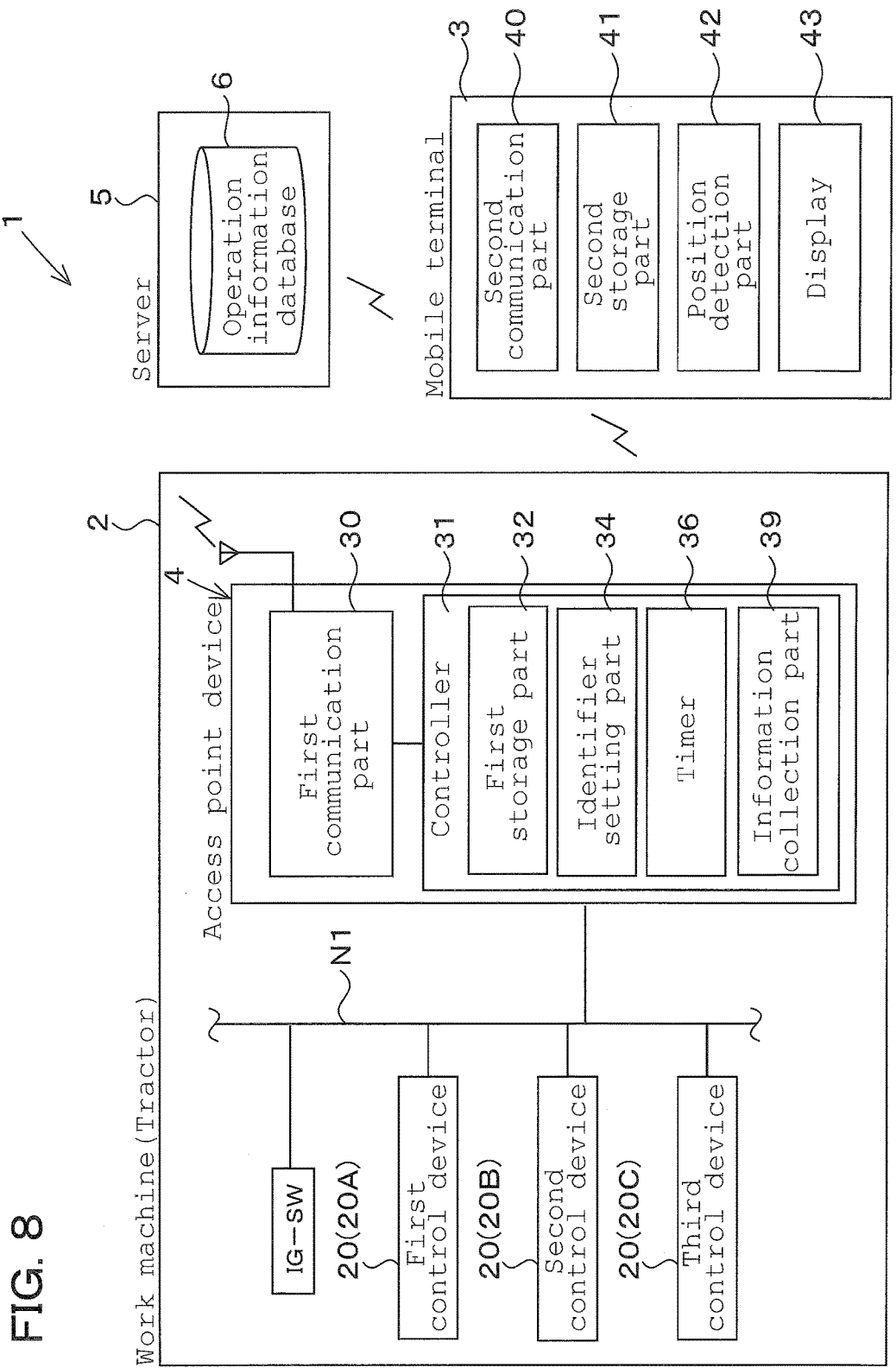
FIG. 8 is an overall view of a communication system of a work machine according to a second embodiment.

As shown in FIG. 8, the access point device 4 includes an information collection part 39 configured to collect information relating to the agriculture (referred to as agricultural operation data) among the operation information (states of the work machine) outputted to the in-vehicle network. The information collection part 39 is constituted of a program and the like stored in the controller 31.

The items to be collected are preliminarily set to the information collection part 39, and the information collection part 39 automatically collects the various agricultural operation data automatically on the basis of the items preliminarily set. For example, when the tractor 2 is operated with a cultivator coupled as the operation tool 14 to a rear portion of the tractor 2, the data such as a revolution speed of a rotary, a load of the rotary, an engine revolution speed, a vehicle speed, and a cultivation depth are outputted to the in-vehicle network. The information collection part 39 obtains, as the agricultural operation data, the data such as the revolution speed of a rotary, the load of the rotary, the engine revolution speed, the vehicle speed, and the cultivation depth. The revolution speed of a rotary, the load of the rotary, the engine revolution speed, the vehicle speed, and the cultivation depth are detected by electronic devices such as sensors attached on the tractor 2 or the cultivator.

Additionally, in a case where the operation tool 14 is the fertilizer distributor, an agricultural chemicals distributor, or a seed distributor, data such as a vehicle speed, an engine revolution speed and a distribution amount (a fertilizer distribution amount, an agricultural chemicals distribution amount and a seed distribution amount) are outputted on the in-vehicle network, the information collection part 39 obtains the vehicle speed, the engine revolution speed, the fertilizer distribution amount, the agricultural chemicals distribution amount and the seed distribution amount as the agricultural operation data. The fertilizer distribution amount, the agricultural chemicals distribution amount, the seed distribution amount and the like, meanwhile, are also detected by the electronic devices and the like attached on the tractor 2, the fertilizer distributor, the agricultural chemicals distributor or the seed distributor. Or, in a case where the operation tool 14 is a harvester, the data such as the vehicle speed, the engine revolution speed and a yield amount are outputted on the in-vehicle network, and the information collection part 39 obtains the vehicle speed, the engine revolution speed and the yield amount as the agricultural operation data. The yield amount is detected also by the electronic device attached to the tractor or the harvester.

The agricultural operation data collected by the information collection part 39 are temporarily stored in the first storage part 32. The first storage part 32 successively accumulates the agricultural operation data in the operation of the tractor 2. The information collection part 39 calculates the collected agricultural operation data into data for the communication. The agricultural operation data in the in-vehicle network flows at an interval of a few ms, and thus a data amount of the agricultural operation data becomes sometimes large. The information collection part 39 accordingly calculates the collected agricultural operation data through a statistic process or the like, and, for example, converts the data into data in units of several tens of seconds and stores the converted data in the first storage part 32.

In the agricultural operation, the agricultural operation may be carried out by a plurality of agricultural operators (for example, an operator A, an operator B and an operator C). In that case, the agricultural operation data of the agricultural operation can be obtained by the mobile terminals 3 carried with the operator A, the operator B and the operator C, the agricultural operation data being obtained when the agricultural operation is carried out by the agricultural machine 2. In the conventional technique, since the access point device 4 does not issue the obtain request, it cannot be known when the agricultural operation data has been updated, and thus the mobile terminals 3 of the operators each may obtain several times the agricultural operation data at the same time.

Meanwhile, in an embodiment of the present invention, the obtain request is issued from the access point device 4 after the agricultural operation data is updated, and thus the operator A, the operator B and the operator C can know the update of the agricultural operation data by watching the communication identifier displayed on the display 43 of the mobile terminal 3. In addition, of the operator A, the operator B and the operator C, the operator aware of the update of the agricultural operation data selects the collection button displayed on the display 43 to obtain the agricultural operation data with use of the mobile terminal 3, and thus the updated agricultural operation data can be obtained. Since the obtain request transmitted from the access point device 4 to an outside stops after the updated agricultural operation data is obtained, the communication identifier is not displayed on the display 43 due to the stop of the obtain request, and thus other operators know that someone has obtained the updated agricultural operation data. In addition, in a case where the agricultural operation data is transmitted from the mobile terminal 3 to the server 5, the agricultural operation data can be prevented from being redundantly saved in the server 5.

In the second embodiment described above, the obtain request is shown by the communication identifier serving as the service set identifier, and the obtain request is issued to the mobile terminal 3 by transmitting the communication identifier. However, the communication identifier for the obtain request and the communication identifier for the data communication may be separated from each other, and then the access point device 4 may transmit the communication identifiers separated from each other. That is, the access point device 4 stores the second identifier for data communication, and necessarily transmits the second identifier regardless of a state of connection when starting up. Then, the wireless communication between the mobile terminal 3 and the access point device 4 is established with use of the second identifier in accordance with a procedure shown in FIG. 3. The access point device 4, meanwhile, transmits the communication identifier for obtain request at a time when the obtain request is issued. In this manner, under a state where the mobile terminal 3 is connected to the access point device 4, the communication identifier for obtain request can be transmitted toward the mobile terminal 3 without disconnecting the connection between the access point device 4 and the mobile terminal 3. In other words, in a case where the communication identifier serving as the service set identifier is changed, the communication is sometimes disconnected once at a time when the communication identifier is changed. However, two identifiers are employed and one of the identifiers is used for the data communication in that case, and thus the connection between the access point device 4 and the mobile terminal 3 can be continued.

In the second embodiment described above, the operation information is collected by selecting the collection button displayed on the display part 43. however, instead of that, the mobile terminal 3 may connect to the access point device 4 transmitting the communication identifier when the mobile terminal 3 receives the communication identifier showing the obtain request for data, and thus the operation information may be obtained automatically. In that case, it is preferable that the access point device 4 transmits the operation information only to the mobile terminal 3 logging in first after the transmission of the communication identifier.

(Third Embodiment)

Figure 9:
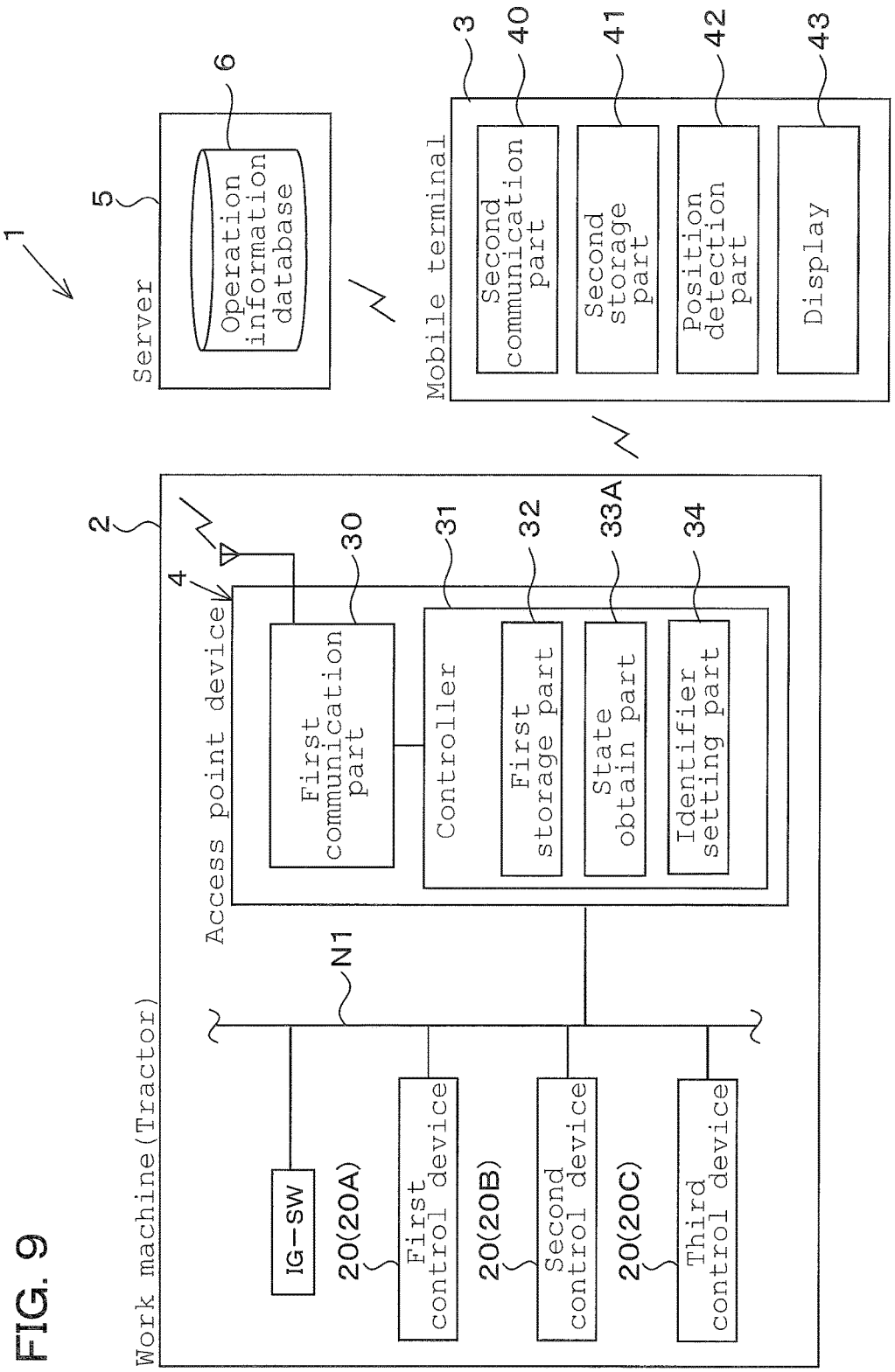
FIG. 9 is an overall view of a communication system of a work machine according to a third embodiment.

FIG. 9 is an overall view of a communication system for work machines according to a third embodiment. Configurations different from the configurations of the embodiments described above will be explained.

Figure 10:
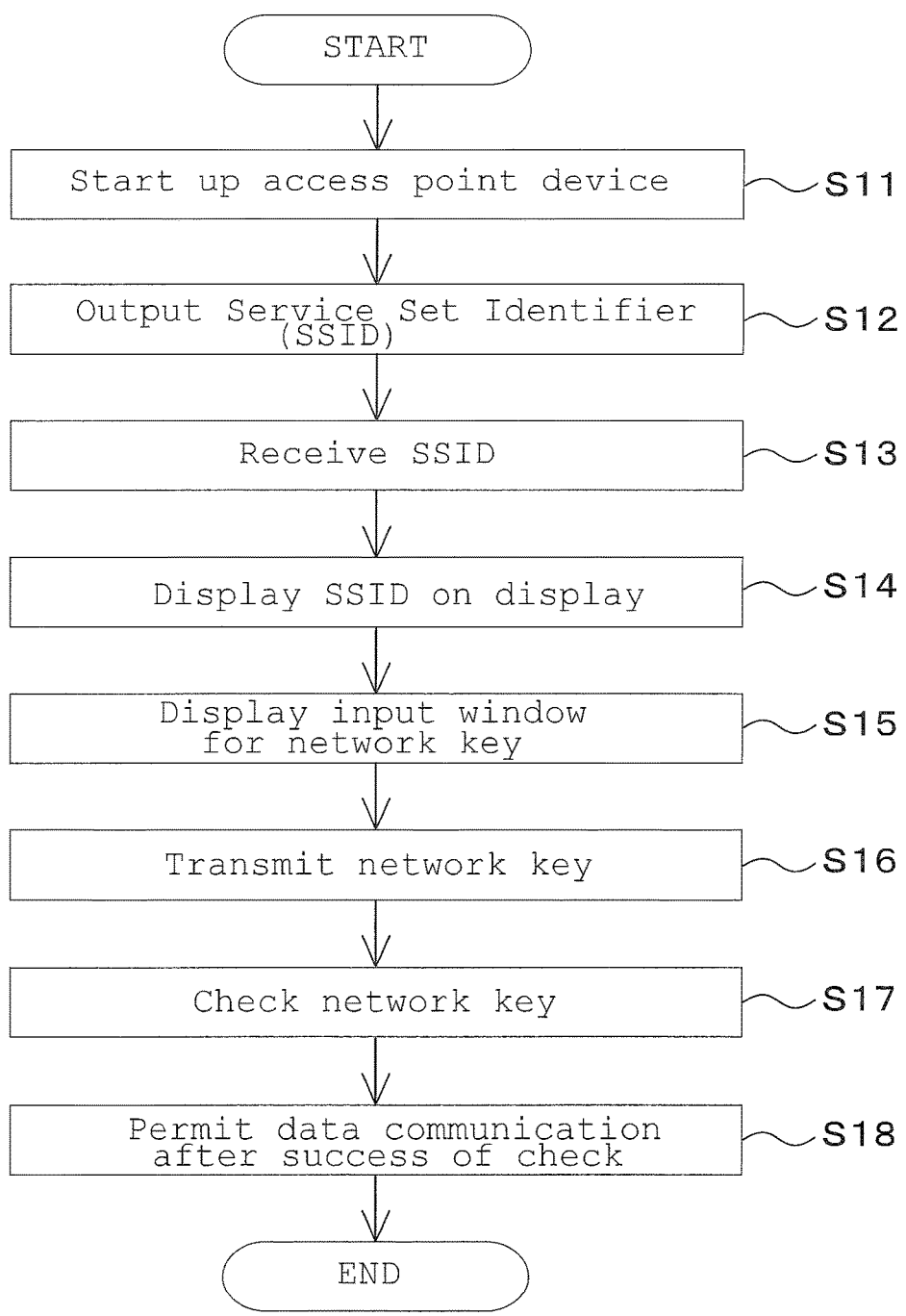
FIG. 10 is a flowchart showing a flow of connecting a mobile terminal to an access point device according to the third embodiment.

FIG. 10 is a flowchart showing a flow of connecting a mobile terminal to an access point device according to the third embodiment.

As shown in FIG. 10, when an ignition switch of the tractor 2 is turned on for example, the access point device 4 starts up (S11), and the first communication part 30 refers to the communication setting information of the first storage part 32 to output the service set identifier (the S SID) to an outside (S12). When the mobile terminal 3 receives the SSID transmitted from the first communication part 30 to the outside (S13), the mobile terminal 3 displays the SSID on the display 43 constituted of a liquid crystal panel and the like (S14) and displays an input window for a network key on the display 43 (S15). After the network key is inputted to the input window of the mobile terminal 3, the network key is transmitted from the mobile terminal 3 to the access point device 4 (S16), and when the network key is inputted to the access point device 4, the network key being transmitted from the mobile terminal 3, the first communication part 30 or the controller 31 checks (authenticates) the network key transmitted from the mobile terminal 3 with the network key stored in the first storage part 32 (S17). Here, when the check (authentication) of the network is success, the first communication part 30 or the controller 31 permits the data communication between them (S18). On the other hand, when the check between the network key from the mobile terminal 3 and the network key stored in the first storage part 32 is not success, the first communication part 30 or the controller 31 does not establish the wireless communication to the mobile terminal 3 and does not permit the data communication. The process to establish the wireless communication between the first communication part 30 and the mobile terminal 3, meanwhile, is not limited to the process described above, and the process to display the network key on the input window and the like may be omitted.

As described above, when the wireless communication between the access point device 4 and the mobile terminal 3 is established, the operation information stored in the first storage part 32 can be transmitted to the mobile terminal 3 through the first communication part 30. The operation information obtained by the mobile terminal 3 is stored in the second storage part 41. In addition, the data of the mobile terminal 3 can be transmitted to the electronic devices such as the first communication part 30, the controller 31 and the control devices 20.

Meanwhile, the operation information stored in the second storage part 41 can be transmitted to the server 5 by the second communication part 40 of the mobile terminal 3 through the mobile phone communication network or the data communication network. In the server 5, the operation information transmitted from the mobile terminal 3 is stored in the operation information database 6. The server 5, then, is capable of sorting and analyzing the operation information with use of the operation information stored in the operation information database 6.

According to the communication system 1 for work machines, a bidirectional data communication can be performed by connecting the mobile terminal 3 to the access point device 4. That is, data such as the operation information can be obtained by connecting the mobile terminal 3 to the access point device 4.

As described above, the data of the tractor 2 can be obtained through the connection process to connect the mobile terminal 3 to the access point device 4. However, the data of the tractor 2 can be obtained without the connection process, if necessary.

In the following description, the obtaining of data in a method not employing the connection process will be explained.

The access point device 4 includes a state obtain part (a state receiver) 33A and an identifier setting part 34. The state obtain part 33A and the identifier setting part 34 are constituted of programs and the like stored in the controller 31.

The state obtain part 33A obtains various states of the tractor 2, and obtains the operation information (a detection signal, a switch signal, a command signal and a notification signal) outputted to the in-vehicle network N1, that is, the states of the tractor. For example, the state obtain part 33A obtains the notification signal showing a shortage of fuel.

The identifier setting part 34 sets a state of the tractor obtained by the state obtain part 33A as the first identifier capable of being obtained by the mobile terminal 3. The first identifier is the service set identifier (the SSID), and thus the service set identifier includes the state of the tractor. When the state obtain part 33A obtains the notification signal showing a shortage of fuel, the identification setting part 34 shows the shortage of fuel with use of alphanumeric characters, for example, "TRACTOR-1005", and sets the "TRACTOR-1005" as the first identifier that is the service set identifier. To be detailed, in setting the first identifier, the identifier setting part 34 sets the characters (TRACTOR) in a former portion (posterior to the hyphen) of the first identifier as the characters identical to the service set identifier (the second identifier). And, the identifier setting part 34 sets the first identifier by adding the characters "1005" showing the shortage of fuel after the characters on the posterior portion. In this manner, on the basis of the characters shown in the posterior portion of the first identifier, an operator is capable of recognizing a state of the tractor 2 mounting the access point device 4 shown in the second identifier. A sender can be easily specified by incorporating characters identical to the second identifier of the access point device 4 serving as the sender. However, the characters identical to the second identifier is not necessarily to be incorporated to the first identifier.

After the setting of the first identifier by the identifier setting part 34, the set first identifier, that is, the "TRACTOR-1005" is transmitted to an outside by the first communication part 30.

Next, the first identifier will be explained in further detail.

As explained in FIG. 10, the service set identifier (the second identifier) is transmitted from the access point device 4 to an outside in connecting the mobile terminal 3 to the access point device 4. The second identifier is an identifier for data communication. the identifier being used for establishing the wireless communication between the mobile terminal 3 and the access point device 4. On the other hand, the first identifier set by the identifier setting part 34 is an identifier showing the state of the tractor and is an identifier for monitor.

The first communication part 30 of the access point device 4 also sends the first identifier serving as the identifier for monitor to an outside separately from the second identifier serving as an identifier for data communication. Then, in a case where the mobile terminal 3 is in a communication area where the first identifier and the second identifier outputted from the access point device 4 can be received, two identifiers (the first identifier and the second identifier) are displayed on the display 43 of the mobile terminal 3 regardless of a state of connection to the access point device 4. For example, the "TRACTOR-1005" that is the first identifier and the "TRACTOR" that is the second identifier are displayed on the display 43 of the mobile terminal 3.

In a case where an operator carrying the mobile teiniinal 3 selects the "TRACTOR" that is the second identifier under a state where the mobile terminal 3 is not connected to the access point device 4 yet, the mobile terminal 3 can be connected to the access point device 4 transmitting the second identification, and thus the mobile terminal 3 can obtains the operation information. On the other hand, the "TRACTOR-1005" that is the first identifier is displayed on the display 43 of the mobile terminal 3, and thus the operator carrying the mobile terminal 3 can know the shortage of fuel when watching the first identifier.

That is, according to the communication system 1 for work machines, the mobile terminal 3 can be connected to the access point device 4 with use of the second identifier, and meanwhile a state of the tractor 2 can be known with use of the first identifier.

Then, when the state of the tractor 2 changes, the first identifier changes in accordance with the state of the tractor 2. In a case where the operation tool 14 attached to a rear portion of the tractor 2 is, for example, a fertilizer distributor, the first identifier changes in accordance with a fertilizer load of the fertilizer distributor. The following explanation will be continued supposing that the fertilizer load is outputted from a control device, a sensor or the like controlling the fertilizer distributor (the operation tool 14) to the in-vehicle network.

Figure 11:
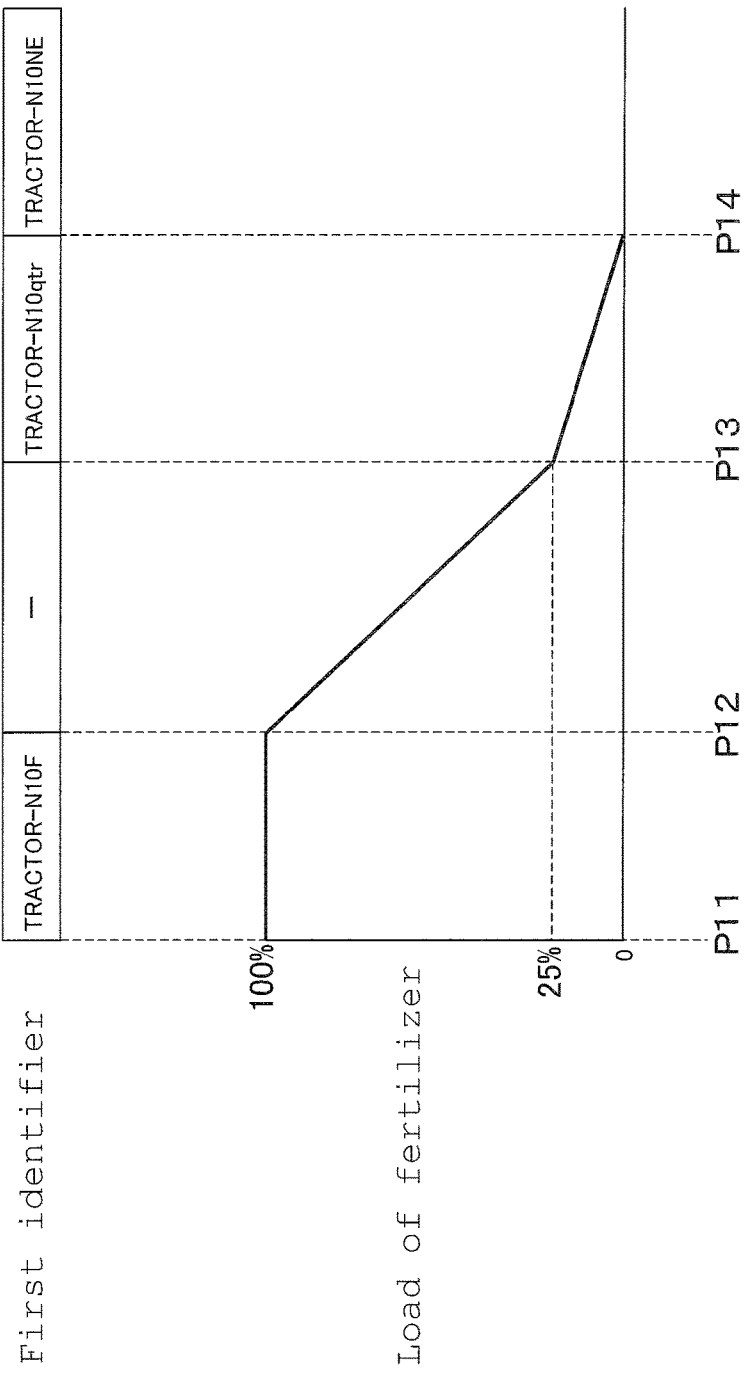
FIG. 11 is a view showing a relation between a first identifier and a fertilizer load according to the third embodiment.

FIG. 11 is a view showing a change of the first identifier based on a change of the fertilizer load. As shown in FIG. 11. fertilizer is fully filled in the fertilizer tank in a period from a time point P11 to a time point P12, and thus the fertilizer load shows an sufficient amount. The state obtain part 33A obtains the sufficient amount of the fertilizer load from a detection signal flowing in the in-vehicle network, and the identifier setting part 34 sets a first identifier (for example, "TRACTOR-N10F") showing that the fertilizer load is sufficient. Then, the first communication part 30 transmits the "TRACTOR-N10F" serving as the first identifier to an outside. When the state obtain part 33A obtains a detection signal at a time point P13 in progression of fertilizer distribution, the detection signal showing that the fertilizer load is 25% or less with respect of a total load, the identifier setting part 34 changes the identifier to the first identifier (for example, "TRACTOR-N10qtr") showing that the fertilizer load is low. Then, the identifier setting part 34 transmits the "TRACTOR-N10qtr" to an outside, the "TRACTOR-N10qtr" being the first identifier having been changed. In addition, when the state obtain part 33A obtains a detection signal at a time point P14, the detection signal showing that the fertilizer load is zero, the identification setting part 34 changes the identifier to the first identifier (for example, "TRACTOR-N10E") showing that the fertilizer load is zero. Then, the identification setting part 34 transmits the "TRACTOR-N10E" to an outside, the "TRACTOR-N10E" being the first identifier having been changed.

As described above, when the first identifier is changed in accordance with the change of the fertilizer load, the mobile terminal 3 can know a state of the fertilizer load only by display the first identifier on the display 43 on a side of the mobile terminal 3, the first identifier being transmitted from the access point device 4. For example, in a case where a distribution operation is carried out by a worker (an operator) and another worker (a helper), the operator driving the tractor 2 to distribute fertilizer, the helper carrying out a supplementary operation around an agricultural field, the first identifier is displayed on the mobile terminal 3 of the helper, the first identifier showing that the fertilizer load is low, and thus the helper can carry out an operation to prepare the fertilizer before the fertilizer is run out.

As described above, since the access point device 4 includes the state obtain part 33A, the identifier setting part 34 and the first communication part 30, a state of work machine can be set as a first identifier (for example, service set identifier) capable of being obtained by the mobile terminal 3, and the set first identifier can be transmitted separately from the second identifier for connection of the wireless communication. In this manner, the wireless communication between the mobile terminal 3 and the access point device 4 can be established using the second identifier, and thus the data communication can be performed between them. On the other hand, since the first identifier can be displayed separately from the second identifier on a side of the mobile terminal 3, the state of work machine can be known by the operator watching the first identifier. In addition, as a way of transmitting the state of work machine toward the mobile terminal 3, the state of work machine is shown by the service set identifier, and then the service set identifier is transmitted to the mobile terminal 3. Accordingly, there is no need to newly constitute a system (a device) for transmitting the state of work machine to an outside, and thus the state of work machine can be simply transmitted toward the mobile terminal 3. In addition, the first identifier set by the identifier setting part 34 is the service set identifier and can be transmitted as a broadcast signal to an outside, and thus is capable of transmitting various information in a wide area.

In addition, when the state of work machine changes, the identifier setting part 34 sets the changed state of work machine as the first identifier, and then transmits the set first identifier toward the mobile terminal 3 with use of the communication part. Accordingly, the change of the work machine can be immediately known by the mobile terminal 3.

Moreover, since the characters and the like identical to the second identifier used in a wireless communication are used in setting the first identifier, a relation between the first identifier and the second identifier can be known, and thus the access point device 4 transmitting the state of work machine, that is, the work machine can be specified only by watching the characters of the first identifier shared with the second identification.

Figure 12:
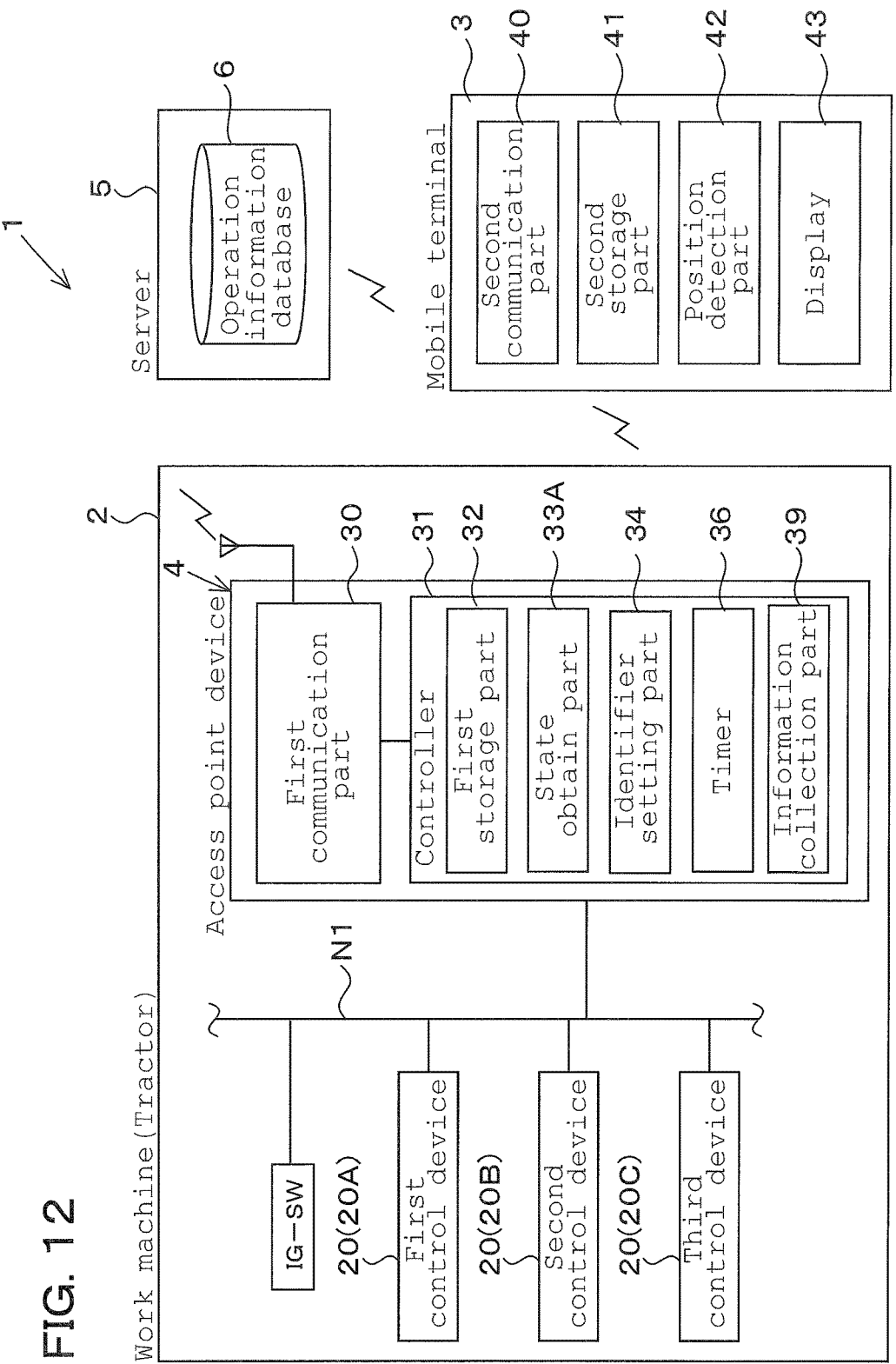
FIG. 12 is an overall view of a communication system of a work machine according to one variation of the third embodiment.

Data of an agricultural machine, meanwhile, may be collected by mounting the access point device 4 according to the third embodiment on the agricultural machine. That is, the configuration described in the second embodiment may be included in the access point device 4 described in the third embodiment. In that case, an overall view of the communication system for work machines is shown in FIG. 12.

The access point device 4 is capable of notifying the mobile teiminal 3 and the like of presence of the agricultural machine, that is, the access point device 4 by transmitting the second identifier to an outside at a predetermined interval.

When the mobile terminal 3 finds the predetermined second identifier and connects to the access point device 4 having the second identifier, the mobile terminal 3 can obtain the agricultural operation data stored in the first storage part 32 of the access point device 4. The access point device 4, meanwhile, transmits the first identifier toward the mobile terminal 3 in accordance with the state of the agricultural machine. In this manner, the mobile terminal 3 is capable of knowing the state of the agricultural machine even in the transmission of the agricultural operation data. Additionally, the mobile terminal 3 is capable of knowing the state of the agricultural machine even in a case where the access point device 4 is not transmitting the agricultural operation data, that is, a case where a wireless communication between the access point device 4 and the mobile terminal 3 is not established. The agricultural operation data obtained by the mobile terminal 3 can analyze and sort the agricultural operations through a process by the mobile terminal 3 or through a process by a computer such as an administration server.

In the third embodiment described above, the first identifier serving as an identifier for monitor and the second identifier serving as an identifier for data communication are used, and thus under a state where the mobile terminal 3 and the access point device 4 are connected to each other, the state of the work machine can be notified to an outside with the connection continuously kept. That is, in a case where the state of work machine is transmitted to an outside with use of the service set identifier, there is a possibility that the communication is disconnected at a time when the service set identifier changes when only a single of the service set identifier is prepared. In an embodiment of the present invention, the first identifier serving as an identifier for monitor and the second identifier serving as an identifier for data communication are prepared, and one of them is employed for data communication. Accordingly, the communication can be continued even when the identifier for monitor is changed.

In the third embodiment, the shortage of fuel and the fertilizer load corresponds to the state of work machine, and the state is transmitted to an outside by using the first identifier. However, the state of work machine to be transmitted by the first identifier to an outside may correspond to anything, and accordingly is not limited to those described above.

In addition, in the third embodiment, the first identifier is displayed on the display 43, the first identifier showing the state of work machine. However, a message may be displayed corresponding to the first identifier. For example, in a case where the mobile terminal 3 receives the first identifier showing a shortage of fuel, a message "Short of fuel" may be displayed, for example. Additionally, in a case where the mobile terminal 3 receives the first identifier, contents corresponding to the first identifier (for example, Short of fuel) may be outputted in voice and may be notified by vibrations.

(Fourth Embodiment)

A fourth embodiment is an embodiment to obtain data of the work machine 2, that is, notified information from the work machine 2. Configurations different from the configurations of the embodiments described above will be explained. A flow of connecting a mobile terminal according to the fourth embodiment to the access point device is the same as the flow shown in FIG. 10 according to the third embodiment.

Figure 13:
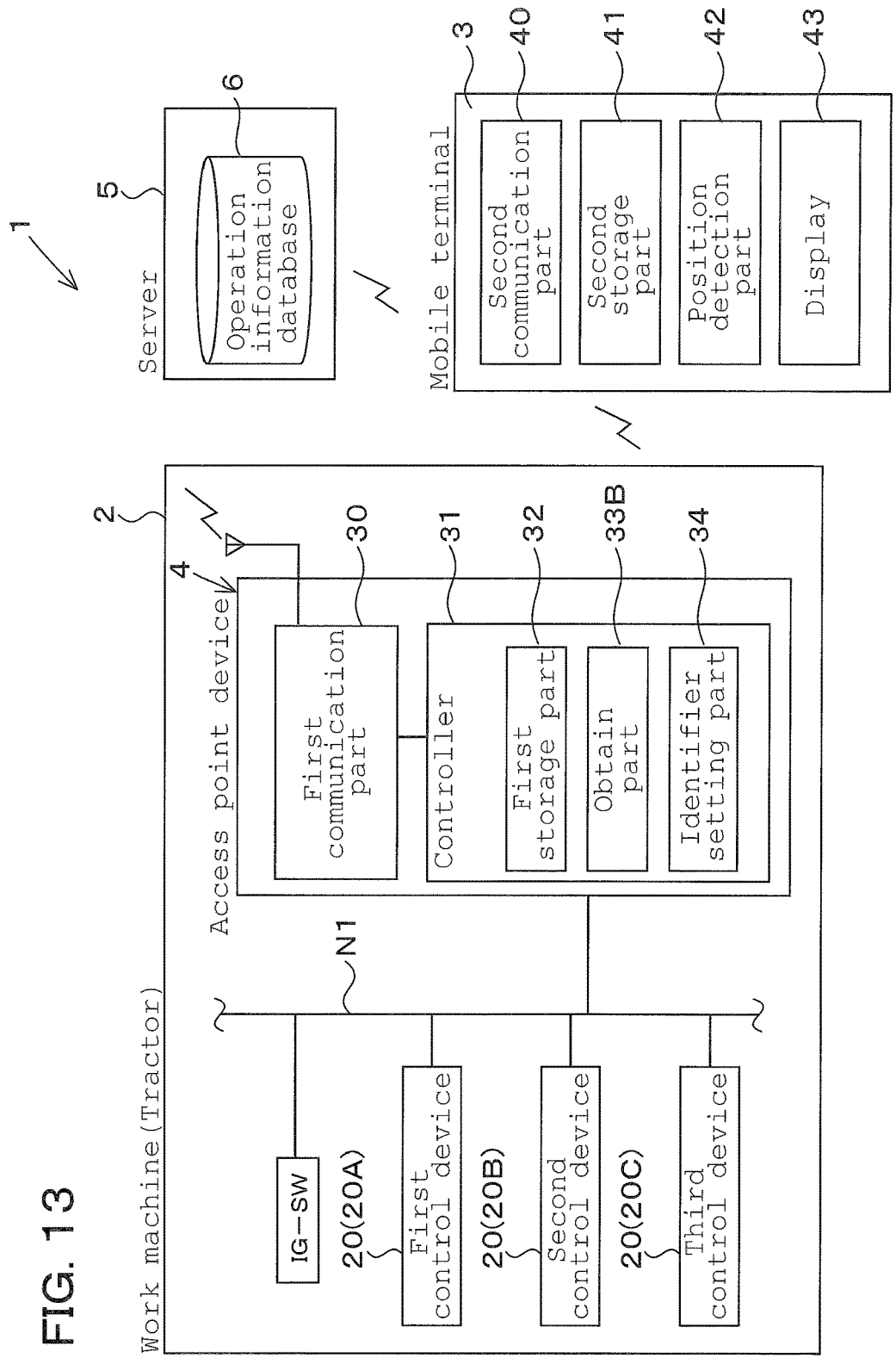
FIG. 13 is an overall view of a communication system of a work machine according to a fourth embodiment.

As shown in FIG. 13, the access point device 4 includes an obtain part (receiver) 33B. The obtain part 33B obtains the notification signal of the operation information (the detection signal, the switch signal, the command signal, the notification signal) outputted to the in-vehicle network N1. The notification signal, for example, includes the notified information to notify occurrence of a trouble in the tractor 2, and includes the notified information to notify a shortage of material mounted on the tractor 2. The trouble, meanwhile, means an occurrence of malfunction or abnormality of the electric components or an occurrence of malfunction or abnormality of the operation tool 14. For the convenience of the description, the explanation is made referring information obtained from the notification signal to as the notified information.

The control device 20 mounted on the tractor 2 detects the malfunction or abnormality of the electric components or the malfunction or abnormality of the operation tool 14 with use of various types of signals (the detection signal, the switch signal, the command signal and the like). Here, in a case where the malfunction or abnormality of the electric components or the malfunction or abnormality of the operation tool 14 are detected (a case of detecting an occurrence of trouble), the control device 20 outputs the notification signal (the notified information) showing the occurrence of trouble to the in-vehicle network. The obtain part 33B of the access point device 4 obtains the notified information outputted from the control device 20 through the in-vehicle network N1. When the obtain part 33B obtains the notified information showing the occurrence of trouble, the identifier setting part 34 sets an error code and the like corresponding to contents of trouble and sets the error code as the communication identifier capable of being obtained by the mobile terminal 3 as shown in FIG. 14. The communication identifier is, for example, the service set identifier (SSID), and the error code corresponding to trouble is included in the service set identifier.

In a case where the water temperature sensor indicates an abnormal value for example, the identifier setting part 34 sets the communication identifier including an error code (2377) corresponding to an abnormality of the water temperature sensor, for example, the communication identifier "TRACTOR-2377".

Meanwhile, the identifier setting part 34 sets, in setting the communication identifier, the characters (TRACTOR) in a former portion (posterior to the hyphen) of the communication identifier as identification information capable of specifying the access point device 4 or the tractor 2, and sets the latter portion following the identification information (TRACTOR) to "2377" showing that the water temperature sensor is abnormal. In this manner, based on the characters shown in the former portion of the communication identifier, it can be known which access point device 4 or tractor 2 transmits the communication identifier.

Then, the first communication part 30 transmits the set communication identifier, that is, the "TRACTOR-2377" to an outside after the setting of the communication identifier by the identifier setting part 34.

When the mobile terminal 3 receives the communication identifier transmitted from the access point device 4 (the communication part 30), the mobile terminal 3 displays the communication identifier on the display 43. Or, when the mobile terminal 3 receives the communication identifier, the mobile terminal 3 displays a message for an operator in accordance with the error code included in the communication identifier.

As described above, the access point device 4 includes the obtain part 33B and the identifier setting part 34. Then the identifier setting part 34 sets the communication identifier as an identifier showing an occurrence of trouble in a case where the notified information shows the occurrence of trouble. The first communication part 30 transmits the communication identifier to an outside. The occurrence of trouble in the tractor can be immediately known by the operator watching the communication identifier shown in the mobile terminal 3 or the message corresponding to the communication identifier. In addition, as a way of transmitting the occurrence of trouble in the tractor 2 toward the mobile terminal 3, contents (an error code) of the occurrence of trouble is shown by the service set identifier, and then the service set identifier is transmitted to the mobile terminal 3. Accordingly, there is no need to newly constitute a system (a device) for transmitting the occurrence of trouble to an outside, and thus the occurrence of trouble can be simply transmitted toward the mobile terminal 3. In addition, the communication identifier set by the identifier setting part 34 is the service set identifier and can be transmitted as a broadcast signal to an outside, and thus is capable of transmitting the informed information in a wide area.

In the fourth embodiment described above, the identifier setting part 34 sets the error codes or the like corresponding to contents of trouble. However, instead of that, the control device 20 may set the error code corresponding to the trouble and output the error code as the notified information to the in-vehicle network N1 at a time when the control device 20 detects the occurrence of trouble. In that case, the identifier setting part 34 sets the communication identifier with use of the error code transmitted from the control device 20. Additionally, in a case where the electric components and the operation tool cause a malfunction or abnormality, the electric components and the operation tool may output the error code as the notified information itself instead of the control device 20 and the identifier setting part 34 setting the error code in accordance with the contents of trouble.

Then, in the fourth embodiment described above, the occurrence of trouble is transmitted as the communication identifier to an outside in a case where the tractor 2 causes a trouble. However, the shortage of material may be transmitted as the communication identifier to an outside in a case where the material used in an operation of the tractor 2 is short. In the fourth embodiment, the material is a substance used in the operation carried out by the tractor 2, and for example, the material is the fertilizer, the agricultural chemicals or seeds in a case where the operation tool 14 attached to the tractor 2 is the fertilizer distributor, the agricultural chemicals distributor or the seed distributor. Meanwhile, in a case where the work machine is not the tractor but a rice planting machine, the material is a rice seedling transplanted by the rice planting machine.

In the following description, a case where the fertilizer distributor is attached is explained as an example.

The fertilizer load in the fertilizer distributor is detected by the control device, a sensor or the like for controlling the fertilizer distributor, and is outputted to the in-vehicle network N1. In a case where the fertilizer load is short, the control device 20 outputs the shortage as the notified information to the in-vehicle network N1 on the basis of the fertilizer load outputted to the in-vehicle network N1.

Figure 15:
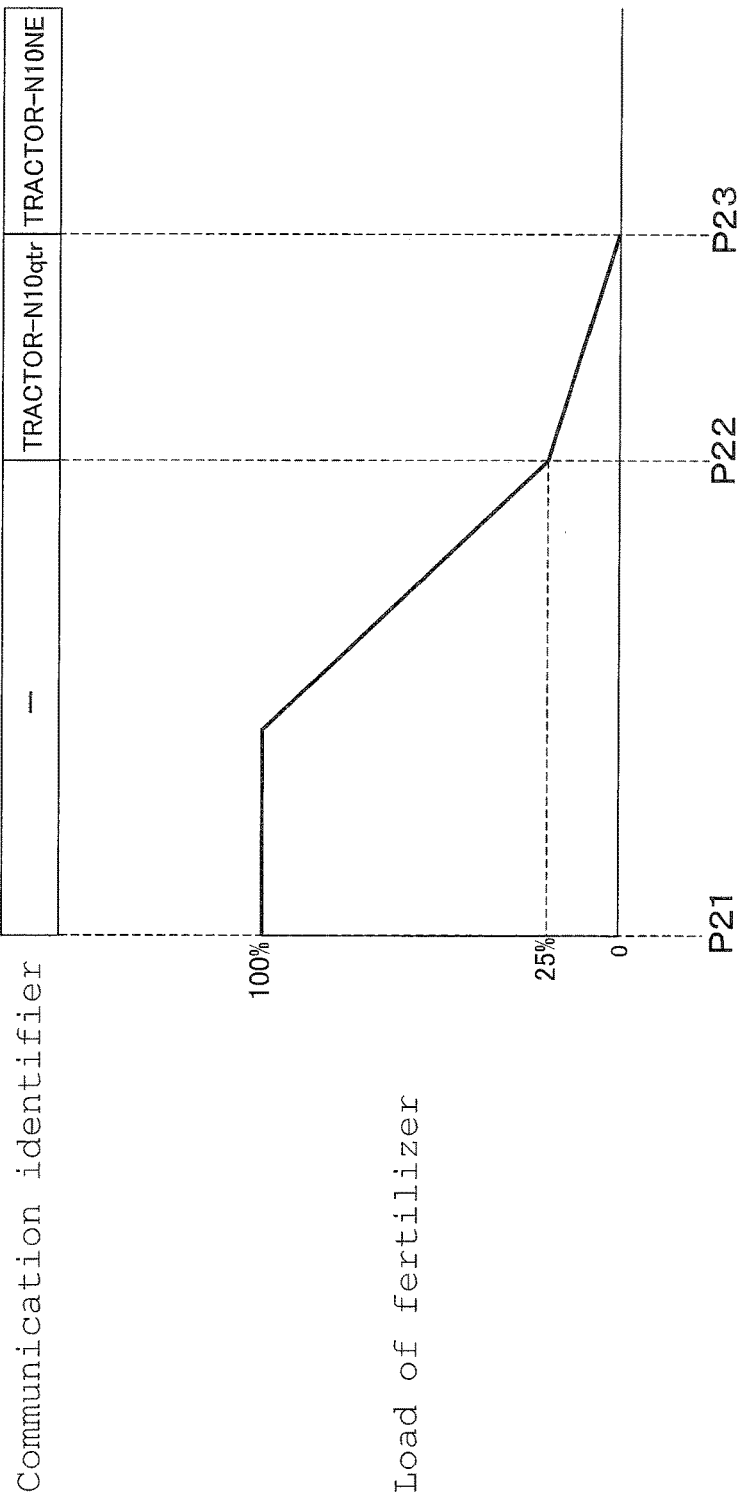
FIG. 15 is a view showing a relation between a communication identifier and a fertilizer load according to the fourth embodiment.

As shown in FIG. 15, the notified information is not outputted from the control device 20 to the in-vehicle network Ni at a time point P21 when the fertilizer is fully filled in the fertilizer tank of the fertilizer distributor. The identifier setting part 34 does not set the communication identifier under that state.

After that, when the fertilizer is distributed and the fertilizer load is 25% or less at a time point P22 with respect of a total load, the control device 20 outputs the notified information to the in-vehicle network N1, the notified information showing the shortage of the fertilizer load. When the obtain part 33B receives the notified information showing the shortage of the fertilizer load, the identifier setting part 34 sets a code ("TRACTOR-N10qtr") in accordance with the notified information, the code showing that the fertilizer load is 25% or less. The first communication part 30 transmits the "TRACTOR-N10qtr" serving as the changed communication identifier to an outside.

When the mobile terminal 3 receives the "TRACTOR-N10qtr" serving as the communication identifier, the mobile terminal 3 displays the communication identifier on the display 43. Or, when the mobile terminal 3 receives the "TRACTOR-N10qtr" serving as the communication identifier, the mobile terminal 3 displays a message "Fertilizer load is low" for an operator on the display 43 on the basis of the communication identifier, for example.

When the state obtain part 33B obtains a detection signal at a time point P23 in progression of fertilizer distribution, the detection signal showing that the fertilizer load is zero, the identifier setting part 34 changes the identifier to the communication identifier (for example, "TRACTOR-N10E") showing that the fertilizer load is zero. Then, the first communication part 30 transmits the "TRACTOR-N10E" to an outside, the "TRACTOR-N10E" being the communication identifier having been changed. When the mobile terminal 3 receives the "TRACTOR-N10E" serving as the communication identifier, the mobile terminal 3 displays the communication identifier on the display 43. Or, when the mobile terminal 3 receives the "TRACTOR-N10E" serving as the communication identifier, the mobile terminal 3 displays a message "Fertilizer load is zero" for an operator on the display 43 on the basis of the communication identifier, for example. However, when the fertilizer is refilled and then the fertilizer load becomes 25% or more with respect to a total fertilizer load, the identifier setting part 34 resets the communication identifier, that is, stops transmitting the communication identifier set on the basis of the shortage of materials.

In the fourth embodiment described above, the message for an operator is displayed on the display 43. However, the message may be notified in voice and may be notified by vibrating the mobile terminal 3 in accordance with the message.

As described above, in a case where the notified information show the shortage of materials, the identifier setting part 34 sets the communication identifier as an identifier showing the shortage of material, and the first communication part 30 transmits the communication identifier to an outside. In this manner, the state of the fertilizer load can be known on a side of the mobile terminal 3 only by displaying, on the display 43, the communication identifier transmitted from the access point device 4 or the message corresponding to the communication identifier (for example, Shortage of fertilizer).

For example, in a case where a distribution operation is carried out by a worker (an operator) and another worker (a helper), the operator driving the tractor 2 to distribute fertilizer, the helper carrying out a supplementary operation around an agricultural field,. In that case, the communication identifier is displayed on the mobile terminal 3 of the helper, the communication identifier showing that the fertilizer load is low, and thus the helper can carry out an operation to prepare the fertilizer before the fertilizer is run out.

Here, a case of application to the rice planting machine will be explained. The helper can recognizes whether the rice seedlings are short from a separated position in a rice planting operation carried out by the operator and the helper if the rice seedling attachment base of the rice planting machine can be seen. In a case where the rice planting machine turns and then the rice seedling attachment base is lost in sight, it cannot be seen whether the rice seedlings is short on the rice seedling attachment base. Even in that case, since the communication identifier is displayed on the mobile terminal 3 of the helper when the rice seedling is short, the shortage of the rice seedlings can be known if the rice seedlings cannot be directly seen.

In the fourth embodiment described above, the identifier setting part 34 sets the code and the like in accordance with a degree of shortage of materials. However, instead of that, the control device 20 may set a code in accordance with the degree of shortage of materials at a time when the control device 20 detects the shortage of materials, and then the code may be outputted as the informed information to the in-vehicle network N1. In that case, the identifier setting part 34 sets the communication identifier with use of a code transmitted from the control device 20. In addition, the fertilizer distributor may output the code corresponding to the degree of shortage of material as the informed information instead of the control device 20 or the identifier setting part 34 setting the code in accordance with the degree of shortage of materials.

Next, a modified example of the fourth embodiment will be explained. The modified example shows a modified example of a case where the work machine (the tractor) occurred a trouble.

Figure 16:
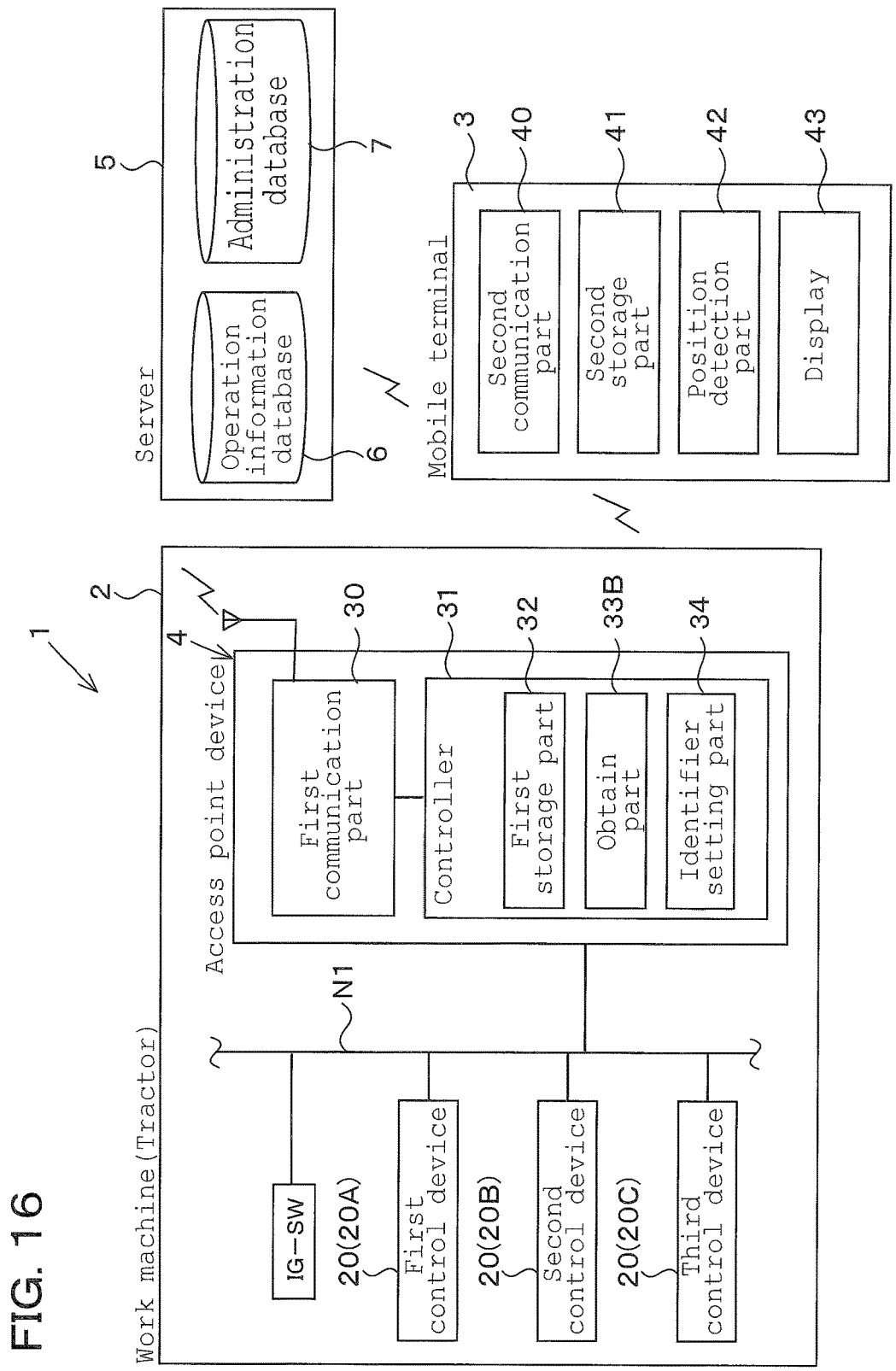
FIG. 16 is an overall view of a communication system of a work machine according to one variation of the fourth embodiment.

As shown in FIG. 16, the server 5 manages various data relating to maintenance inspection and repair to the work machine, and is, for example, installed in a service company (a service center) for the maintenance inspection to the work machine When the mobile terminal 3 receives the communication identifier showing an occurrence of trouble, the mobile terminal 3 transmits the occurrence of trouble to the server 5. To be detailed, when the mobile terminal 3 receives the communication identifier, the mobile terminal 3 transmits, to the server 5, the communication identifier, a position (positional data) detected by the position detection part 42, and the identification information (terminal identification information) of the mobile terminal 3 The server 5 stores, in the administration database 7, the communication identifier, the positional data and the terminal identification information each transmitted from the mobile terminal 3 as shown in FIG. 16. The terminal identification information, meanwhile, is preliminarily related to operator information (for example, a name and an address of an operator) specifying the operator, and thus the operator can be specified when the terminal identification information is obtained. In addition, the mobile terminal 3 may transmit the operator information to the server 5 instead of the terminal identification information.

Figure 17:
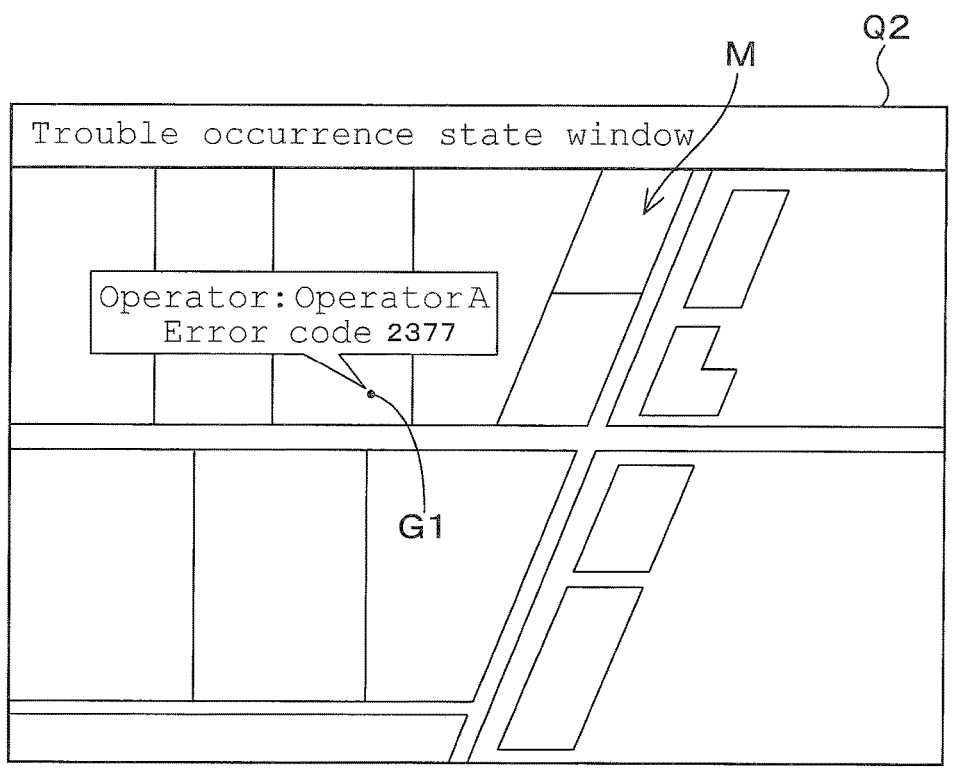
FIG. 17 is a view showing a trouble occurrence state window according to one variation of the fourth embodiment.

The server 5 displays information of the occurrence of trouble (trouble information) on a display (a monitor) of a computer connected to the server 5. For example, the trouble information is displayed on the display such as a personal computer installed in the service center. To be detailed, as shown in FIG. 17, a trouble occurrence state window Q2 is displayed on the display of the PC, and a terminal position G1, the operator information (for example, an operator name) and the contents of the trouble (for example, the error code) are displayed on a map M shown in the trouble occurrence state window Q2, the terminal position G1 being obtained from the positional data, the operator information being obtained from the terminal identification information, the contents being obtained from the communication identifier.

As described above, according to the modified embodiment, in a case where a trouble, for example, occurs the work machine 2, the occurrence of trouble can be notified to the server through the mobile terminal 3, the server 5 managing the occurrence of trouble. In addition, the trouble occurrence information is displayed on the display of the PC by the server 5, and thus a service staff and the like can deal with the trouble quickly. In the embodiment described above, the trouble occurrence information is displayed on the PC in the service center. However, the trouble occurrence information may be displayed on the mobile terminal 3 logging in the server 5. According to that, the service staff carrying the mobile terminal 3 can rapidly move to a place where the trouble occurred.

In the fourth embodiment, the mobile terminal 3 transmits the communication identifier, the positional data and the terminal identification information to the server 5. However, in addition to that, the mobile terminal 3 may transmit the operation information obtained by the mobile terminal 3 to the server 5.

In the embodiment described above, the notified information is shown by the communication identifier serving as the service set identifier, the communication identifier is transmitted, and thereby the contents to be informed is notified to the mobile terminal 3. However, the communication identifier for notification may be transmitted from the access point device 4 separately from the communication identifier for data communication. That is, the access point device 4 stores the communication identifier for data communication, and necessarily transmits the communication identifier for data communication regardless of a state of connection when starting up. Then, the wireless communication between the mobile terminal 3 and the access point device 4 is established using the communication identifier for data communication in a procedure shown in FIG. 10. The access point device 4, meanwhile, transmits the communication identifier for notification at a time when the notification is issued to an outside. In this manner, under a state where the mobile terminal 3 is connected to the access point device 4, the communication identifier for notification can be transmitted toward the mobile terminal 3 without disconnecting the connection between the access point device 4 and the mobile terminal 3.

Figure 18:
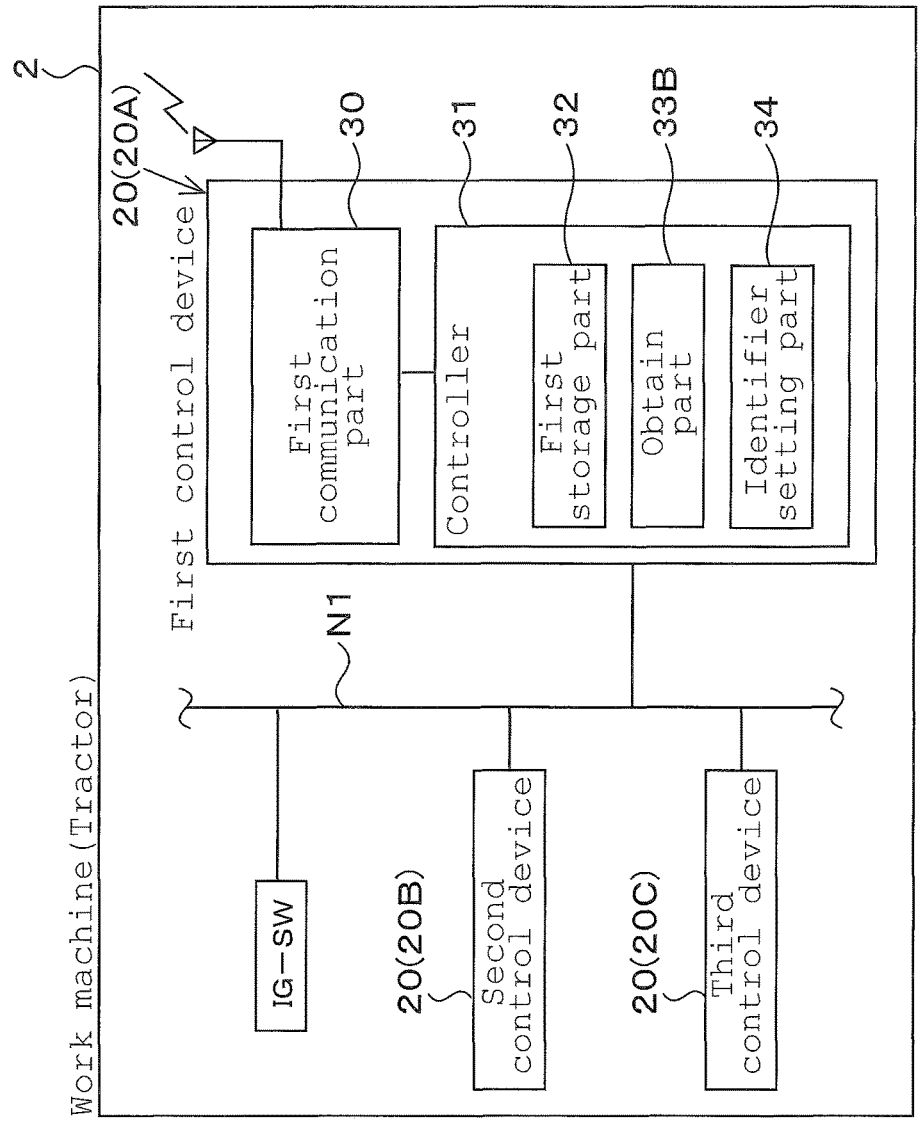
FIG. 18 is a view showing an example employing a first communication part and a first storage part in a control device according to another variation of the fourth embodiment.

Additionally, in the embodiments described above, the access point device 4 is attached to the work machine 2. However, the access point device 4 may be integrally formed with the work machine 2. That is, as shown in FIG. 18, the first communication part 30, the controller 31, the first storage part 32, the obtain part 33B and the identifier setting part 34 may be included, for example, in the first control device 20A of the control devices 20. The first communication part 30, the controller 31, the first storage part 32, the obtain part 33B and the identifier setting part 34 may be included in the second control device 20B, the third control device 20C or the like.

In the embodiments described above, the notification signal (notification information) showing the "Occurrence of trouble" and the notification signal (notification information) showing the "Shortage of materials" are explained. However, the notification information may be anything transmitted from the work machine For example, notification information showing discharge of unhulled rice from an auger in a combine is transmitted from the access point device 4 mounted on the combine to the mobile terminal 3 with use of the communication identifier. When the mobile terminal 3 receives the communication identifier, the mobile terminal 3 notifies an operator of the discharge of unhulled rice from the auger with use of displays, sounds such as voices, and vibrations, and displays an input window for inputting a container number that the unhulled rice is filled in. In addition, the mobile terminal 3 connects to the access point device 4 of the combine to collect the operation information (for example, a moisture content and a protein substance measured by the combine), and relates the operation information to the container number inputted in the input window.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

Obviously, numerous modifications and variations of the present invention are possible in light of the above teachings. It is therefore to be understood that within the scope of the appended claims, the invention may be practiced otherwise than as specifically described herein.

What is claimed is:

1. An access point device for a work machine, the access point device being configured to transmit a communication identifier that is configured to be obtained by a mobile terminal in establishing connection via wireless communication between an in-vehicle network disposed on the work machine and the mobile terminal on an outside network other than the in-vehicle network, comprising:
    a memory to store data of the work machine;
    a controller to newly generate another communication identifier when the data stored in the memory is updated, the other communication identifier being generated by adding, to the communication identifier, information representing request to obtain the updated data; and
    a communicator to transmit the other communication identifier generated by the controller to the mobile terminal and to transmit the updated data to the mobile terminal when the mobile terminal is connected to the access point device via the wireless communication after the mobile terminal receives the other communication identifier transmitted by the communicator.

2. The access point device according to claim 1, wherein the controller sets the request as the communication identifier when the data in the memory is updated, and the communicator stops the transmission of the communication identifier when the mobile terminal obtains the data in accordance with the request shown in the communication identifier after the transmission of the communication identifier.

3. The access point device according to claim 2, wherein the controller sets the request as the communication identifier, when the data in the memory is updated after the mobile terminal has obtained the data.

4. A communication system for a work machine, comprising:
    a mobile terminal; and
    an access point device to transmit a communication identifier to an in-vehicle network disposed on the work machine and to the mobile terminal on an outside network other than the in-vehicle network, the communication identifier being configured to be obtained by a mobile terminal, the access point device comprising:
    a memory to store data of the work machine;
    a controller to newly generate another communication identifier when the data stored in the memory is updated, the other communication identifier being generated by adding, to the communication identifier, information representing request to obtain the updated data; and
    a communicator to transmit the other communication identifier generated by the controller to the mobile terminal and to transmit the updated data to the mobile terminal when the mobile terminal is connected to the access point device via the wireless communication after the mobile terminal receives the other communication identifier transmitted by the communicator.

5. An access point device for a work machine, the access point device being configured to transmit a second identifier that is configured to be obtained by a mobile terminal in establishing connection via wireless communication between an in-vehicle network disposed on the work machine and the mobile terminal on an outside network other than the in-vehicle network, comprising:
    a state receiver to obtain a state of the work machine, the state receiver being disposed on the work machine;
    a controller to generate a first identifier as a communication identifier to be obtained by the mobile terminal in the wireless communication, the first identifier showing the state of the work machine obtained by the state receiver; and
    a communicator to separately transmit the first identifier generated by the controller and the second identifier that is a communication identifier to be obtained by the mobile terminal in the wireless communication,
    wherein the communicator is configured to establish a wireless communication with the mobile terminal based on the second identifier after transmitting the first identifier generated by the controller.

6. The access point device according to claim 5, wherein the controller sets the first identifier when the state of the work machine changes.

7. A communication system for a work machine, comprising:
    a mobile terminal on an outside network; and
    an access point device being on an in-vehicle network disposed on the work machine and being configured to transmit a second identifier that is configured to be obtained by a mobile terminal in wireless communication, the access point device comprising:
    a state receiver to obtain a state of the work machine, the state receiver being disposed on the work machine;
    a controller to generate a first identifier as a communication identifier to be obtained by the mobile terminal in the wireless communication, the first identifier showing the state of the work machine obtained by the state receiver; and
    a communicator to separately transmit the first identifier generated by the controller and the second identifier that is a communication identifier to be obtained by the mobile terminal in the wireless communication,
    wherein the communicator is configured to establish a wireless communication with the mobile terminal based on the second identifier after transmitting the first identifier generated by the controller.

8. The communication system according to claim 7, wherein
the mobile terminal includes a display to display the first identifier.

9. A work machine comprising:
an access point device being on an in-vehicle network and being configured to transmit a communication identifier to a mobile terminal in establishing connection via wireless communication;
a receiver to obtain information data outputted to an in-vehicle network of the work machine;
a controller newly to generate another communication identifier when the receiver obtains the information data, the other communication identifier being generated by adding, to the communication identifier, information corresponding to the obtained information data; and
a communicator to transmit the other communication identifier to the mobile terminal via wireless communication, the other communication identifier having been generated by the controller and including the information data.

10. The work machine according to claim 9, wherein
the controller sets the communication identifier as an identifier showing occurrence of trouble when the information data shows the occurrence of trouble, and
the communicator transmits the communication identifier to the mobile terminal.

11. The work machine according to claim 9, wherein
the controller sets the communication identifier as an identifier showing a shortage of material to be used in an operation for the work machine, when the information data shows the shortage of the material, and
the communicator transmits the communication identifier to the mobile terminal.

12. A communication system for a work machine, comprising:
a mobile terminal on an outside network; and
an access point device being on an in-vehicle network disposed on the work machine and being configured to transmit a communication identifier that is configured to be obtained by the mobile terminal in wireless communication, the access point device comprising:
a receiver to obtain information data outputted to the in-vehicle network;
a controller to include the obtained information data in the communication identifier when the receiver obtains the information data; and
a communicator to transmit, to the mobile terminal, the communication identifier including the information data via wireless communication, the communication identifier being generated by the controller.

13. The communication system according to claim 12, wherein
the controller sets the communication identifier as an identifier showing occurrence of trouble when the information data shows the occurrence of trouble, and
the communicator transmits the communication identifier to the mobile terminal.

14. The communication system according to claim 13, wherein the mobile terminal notifies a server of a trouble when the information data shows occurrence of the trouble, the server being configured to manage the occurrence of the trouble in the work machine.

15. The communication system according to claim 12, wherein
the controller sets the communication identifier as an identifier showing a shortage of material to be used in an operation for the work machine, when the information data shows the shortage of the material, and
the communicator transmits the communication identifier to the mobile terminal.

16. The communication system according to claim 15, wherein
the mobile terminal displays the shortage of material for the work machine when the communication identifier shows the shortage of the material.

17. A communication method for a work machine, the communication method being configured to connect an access point device being on an in-vehicle network disposed on the work machine to a mobile terminal being on an outside network other than the in-vehicle network via wireless communication, comprising:
generating newly another communication identifier when data of the work machine is updated, the other communication identifier being generated by adding a request signal to obtain the updated data to a communication identifier used in wireless communication between the access point device and the mobile terminal;
transmitting the other communication identifier to the mobile terminal;
receiving the other communication identifier with the mobile terminal;
connecting to the access point device corresponding to the other communication identifier by the mobile terminal after the mobile terminal receives the other communication identifier; and
transmitting the updated data from the access point device to the mobile terminal after the mobile terminal is connected to the access point device.

18. A communication method for a work machine, the communication method being configured to connect an access point device being on an in-vehicle network disposed on the work machine to a mobile terminal being on an outside network other than the in-vehicle network via wireless communication, comprising:
obtaining a state of the work machine;
generating a first identifier as a communication identifier to be obtained by the mobile terminal in the wireless communication, the first identifier showing the state of the work machine;
generating a second identifier to be obtained by the mobile terminal in the wireless communication, the second identifier being a communication identifier other than the first identifier;
separately transmitting the first identifier and the second identifier;
establishing a wireless communication with the mobile terminal based on the second identifier after transmitting the second identifier; and
transmitting the first identifier after establishing the wireless communication.

* * * * *